(12) United States Patent
Kadowaki et al.

(10) Patent No.: US 9,336,200 B2
(45) Date of Patent: *May 10, 2016

(54) ASSISTING DOCUMENT CREATION

(75) Inventors: Isao Kadowaki, Yokohama (JP); Yuriko Nishikawa, Sagamihara (JP); Yoshinori Tahara, Kanagawa (JP); Koichi Takahashi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 617 days.

This patent is subject to a terminal disclaimer.

(21) Appl. No.: 13/548,020

(22) Filed: Jul. 12, 2012

(65) Prior Publication Data

US 2012/0278707 A1     Nov. 1, 2012

Related U.S. Application Data

(63) Continuation of application No. 12/765,657, filed on Apr. 22, 2010, now Pat. No. 8,250,455.

(30) Foreign Application Priority Data

May 13, 2009    (JP) ................................ 2009-116901

(51) Int. Cl.
  *G06F 17/00*   (2006.01)
  *G06F 17/27*   (2006.01)
(52) U.S. Cl.
  CPC .................................. *G06F 17/2755* (2013.01)
(58) Field of Classification Search
  CPC .............. G06F 17/30017; G06F 17/25; G06F 17/30896; G06F 17/2755; G06F 17/21

USPC .......... 707/749, 771, 772; 715/201, 210, 253, 715/255
  See application file for complete search history.

(56) References Cited

U.S. PATENT DOCUMENTS 5,903,905 A * 5/1999 Andersen ................ G06F 17/21
                                                      715/273
6,564,213 B1    5/2003 Ortega et al.
(Continued)

FOREIGN PATENT DOCUMENTS

JP      7064991 A      3/1995
JP      7093314 A      4/1995
(Continued)

OTHER PUBLICATIONS

Patrice-Anne Rutledge, Special Edition Using Microsoft PowerPoint 2002, Jun. 21, 2001, QUE Publishing, pp. 29-37, 47, 107.*

(Continued)

*Primary Examiner* — Scott Baderman
*Assistant Examiner* — Howard Cortes
(74) *Attorney, Agent, or Firm* — Janaki K. Davda; Konrad, Raynes, Davda & Victor LLP

(57) ABSTRACT

Assistance for document creation in a computer system which allows at least one agent to be registered therein is provided. The computer system causes the at least one agent to monitor input by a user during the document creation, acquire information on the input obtained by the monitoring, retrieve at least one content from multiple contents accumulated in a storage unit based on the acquired information, and transmit the retrieved at least one content to a display unit to display the retrieved content on a screen.

19 Claims, 35 Drawing Sheets

(56) References Cited

U.S. PATENT DOCUMENTS

| | | | |
|---|---|---|---|
| 7,353,246 B1* | 4/2008 | Rosen | G06F 17/30855 707/999.01 |
| 7,853,586 B1 | 12/2010 | Patel et al. | |
| 2003/0105589 A1* | 6/2003 | Liu et al. | 702/1 |
| 2004/0267730 A1 | 12/2004 | Dumais et al. | |
| 2005/0027678 A1 | 2/2005 | Aono et al. | |
| 2008/0310724 A1 | 12/2008 | Okumura | |
| 2009/0217159 A1* | 8/2009 | Dexter et al. | 715/271 |
| 2009/0249180 A1* | 10/2009 | Cheng | 715/206 |
| 2010/0251086 A1* | 9/2010 | Haumont et al. | 715/205 |
| 2010/0293447 A1 | 11/2010 | Kadowaki et al. | |

FOREIGN PATENT DOCUMENTS

| | | | |
|---|---|---|---|
| JP | 9016569 A | 1/1997 |
| JP | 09-69087 | 11/1997 |
| JP | 2000010968 A | 1/2000 |
| JP | 2008310571 A | 12/2008 |
| JP | 2009009262 A | 1/2009 |

OTHER PUBLICATIONS

English Abstract & Translation for JP09-69087, published Nov. 3, 1997, Total 16 pp.

IDS Report, Oct. 14, 2011, from the Oct. 11, 2011 Office Action for JP920090011JP1, Total 3 pp.

English Abstract and Machine Translation for JP9016569A, published Jan. 17, 1997, Total 13 pp.

English Abstract and Machine Translation for JP2000010968A, published Jan. 14, 2000, Total 20 pp.

English Abstract and Machine Translation for JP7064991A, published Mar. 10, 1995, Total 24 pp.

English Abstract and Machine Translation for JP7093314A, published Apr. 7, 1995, Total 22 pp.

Notice of Allowance 1, Apr. 16, 2012, for U.S. Appl. No. 12/765,657, filed Apr. 22, 2010 by I. Kadowaki et al., Total 19 pp. [57.197 (NOA1)].

Office Action 1, Nov. 25, 2011, for U.S. Appl. No. 12/765,657, filed Apr. 22, 2010, by I. Kadowaki et al., Total 29 pp. [57.197 (OA1)].

English Abstract for JP2008310571A, published Dec. 25, 2008, Total 1 p. (Also published as: US200810310724).

English Abstract and Machine Translation for JP2009009262A, published Jan. 15, 2009, Total 23 pp.

Amendment 1, Feb. 24, 2012, for U.S. Appl. No. 12/765,657, filed Apr. 22, 2010 by I. Kadowaki et al., Total 10 pp. [57.197 (Amend1)].

Supplemental Amendment 1, Feb. 27, 2012, for U.S. Appl. No. 12/765,657, filed Apr. 22, 2010 by I. Kadowaki et al., Total 10 pp. [57.197 (SuppAmend1)].

* cited by examiner

DOMAIN TABLE 401

| DOMAIN NAME | REGISTERED DOCUMENT |
|---|---|
| GREETING | DOCUMENT 11, DOCUMENT 12, DOCUMENT 13 |
| APOLOGY | DOCUMENT 21, DOCUMENT 22, DOCUMENT 23, DOCUMENT 24 |
| INQUIRY | DOCUMENT 31, DOCUMENT 32, DOCUMENT 33 |
| NEW YEAR GREETING CARD | DOCUMENT 12, DOCUMENT 13, DOCUMENT 41 |
| ... | ... |

DOMAIN TERM TABLE 402

| TERM | DOMAIN NAME | SCORE |
|---|---|---|
| <NAME> | GREETING | 0.7 |
| <NAME> | APOLOGY | 0.7 |
| san (MR.) | GREETING | 0.2 |
| ni (POSTPOSITIONAL PARTICLE) | GREETING | 0.1 |
| <NAME> | APOLOGY | 0.4 |
| ... | ... | ... |

FIG. 4A

DOCUMENT TERM TABLE                                                                 406

| DOCUMENT 1 | {kyo *(today)*, 0.2} {ha *(POSTPOSITIONAL PARTICLE)*, 0.05} {yoi *(good)*, 0.3} ⋯ |
|---|---|
| DOCUMENT 2 | {senjitsu *(the other day)*, 0.3} {ha *(POSTPOSITIONAL PARTICLE)*, 0.1} {tsugo *(convenience)*, 0.2} ⋯ |
| DOCUMENT 3 | ⋯ |
| DOCUMENT 4 | ⋯ |
| ⋯ | ⋯ |

FIG. 4D

Dear Mr. Yamada Taro
    I am really sorry for being late for the appointment the other day,
    although you made an effort to arrange your schedule.
    I was caught in traffic jam and hurried to the meeting place,
    but you had already left the place when I arrived.
    I made haste to contact you by telephone but failed to reach you.
    I would like to apologize for the trouble I have caused you,
    and I hope you will forgive me.
    I would therefore be really grateful if you could again designate
    a time and date that would suit your convenience.
Sincerely Yours,
Suzuki Jiro

2/2

EDITOR UNIT (DISPLAY OF DOCUMENT PROPOSAL)

Dear Mr. Yamada Taro,
    Although I promised to meet you at a lobby in the ABC hotel,
    I was late because I was caught in incident congestion.

AGENT

PROPOSAL OF CONTENT
(DOCUMENT)

EDITOR UNIT (DISPLAY OF ADOPTED PROPOSAL)

Dear Mr. Yamada Taro,
　　I am really sorry for being late for the appointment the other day,
　　although you made an effort to arrange your schedule.
　　I was caught in traffic jam and hurried to the meeting place,
　　but you had already left the place when I arrived.
　　I made haste to contact you by telephone but failed to reach you.
　　I would like to apologize for the trouble I have caused you,
　　and I hope you will forgive me.
　　I would therefore be really grateful if you could again designate
　　a time and date that would suit your convenience.
Sincerely Yours,
Suzuki Jiro 701　　702

AGENT

TRANSMIT ADOPTED
DOCUMENT TO EDITOR

FIG. 7L

ASSISTING DOCUMENT CREATION

CROSS-REFERENCE TO RELATED APPLICATIONS

This application is a continuation of and claims the benefit of U.S. patent application Ser. No. 12/765,657, filed Apr. 22, 2010, and which is a non-provisional application that claims priority benefits under Title 35, Unites States Code, Section 119(a)-(d) or Section 365(b) of Japanese Patent Application No. 2009-116901, filed on May 13, 2009, by Isao Kadowaki, Yuriko Nishikawa, Koichi Takahashi, Yoshinori Tahara, each of which application is incorporated herein by reference in its entirety.

BACKGROUND OF THE INVENTION

The present invention relates to a method for assisting document creation, and a computer and computer program for the same.

Document creation, for example, creation of text data or creation of e-mail send data is time-consuming task. Thus, there have been various methods for assisting users to enhance working efficiency of document creation. For example, one type of known application software is to allow a user to complete document creation only by selecting a document desired to be created, and answering questions. Japanese Patent Application Publication No. H9-69087 describes a document creation apparatus and a document creation method characterized in that a sentence of the same type as a created sentence is retrieved from a database of example sentences, and is presented as an example sentence. The document creation apparatus in Japanese Patent Application Publication No. H9-69087 morphologically analyzes a character string inputted from an input unit, selects a term for a keyword for example sentence database search from the analysis result, and searches the example sentence database by using the keyword (claim 1). In Japanese Patent Application Publication No. H9-69087, however, the morphological analysis is performed and the example sentence is presented only when a document creation assistance is requested.

In the conventional document creation assistance method, a document creation assistance is provided only when an instruction is made by a user. In addition, in the conventional document creation assistance method, a user has to select which field of a document to create and then to select and give an instruction by answering a question as needed. Despite such effort by the user, the conventional document creation assistance can provide only limited document contents as assistance. Moreover, in the template type document creation assistance method, once a user selects a template in advance, the selected template is only a document content provided as assistance.

SUMMARY OF INVENTION

The present invention provides a method for assisting document creation in a computer system which allows at least one agent to be registered therein. The method comprises the computer system causing the at least one agent to execute the steps of monitoring input by a user in a process of the document creation, and acquiring information on the input obtained by thus monitoring, retrieving at least one content from a plurality of contents accumulated in a storage unit, on the basis of the information acquired in the acquiring step, and transmitting the content retrieved in the retrieving step to a display unit in order to display the content on a display.

According to an embodiment of the present invention, in the method, the computer system causes the at least one agent to execute, in response to an event in which the retrieved content is displayed on the screen, the steps of continuously performing the monitoring, searching the plurality of contents on the basis of information on additional input by the user obtained by the continuously performed monitoring, and retrieving at least one other content associated with the information on the additional input, and transmitting the retrieved other content to the display section to display the retrieved other content on the screen.

According to an embodiment of the present invention, in the method, the computer system further causes the at least one agent to execute the step of proposing the retrieved content to the user, and receiving an adoption of the proposed content from the user.

According to an embodiment of the present invention, the retrieving step includes the step of searching the accumulated contents on the basis of the acquired information to retrieve at least one of document data including a keyword matching the acquired information, or document data associated with the keyword, a writing style matching the acquired information, a document domain matching the acquired information, background data matching the acquired information, and image data matching the acquired information.

According to an embodiment of the present invention, the retrieving step includes the step of searching the accumulated contents on the basis of the user information to retrieve at least one of a document created in the past by the user, a writing style created in the past by the user, a domain of a document created in the past by the user, background data created in the past by the user, and image data created in the past by the user.

According to an embodiment of the present invention, in the method, when the retrieved content is a document having a changeable area, the computer system causes the at least one agent to make one or more candidate terms selectable for the changeable area.

According to an embodiment of the present invention, the candidate term is a character string determined as matching the changeable area, from among character strings obtained from the acquired information.

According to an embodiment of the present invention, the candidate term is a character string associated with the determined character string.

According to an embodiment of the present invention, in the method, the computer system further causes the at least one agent to retrieve a content created in the past from among the accumulated contents.

According to an embodiment of the present invention, in the method, the computer system further causes the at least one agent to execute the steps of creating a new content from the information on the input in response to an acquisition of the information on the input, and accumulating the newly created content, as the content created in the past, in the storage unit.

According to an embodiment of the present invention, in the method, the computer system further causes the at least one agent to execute the step of performing a domain document search, a similar document search or a combination search of the two searches from the accumulated contents on the basis of one or more character strings obtained from the acquired information.

According to an embodiment of the present invention, in the method, the computer system further causes the at least one agent to execute the step of, when the combination search of the domain document search and the similar document search is performed, selecting a content by assigning weights to a result of the domain document search and a result of the similar document search, the weights depending on the number of the character strings.

According to an embodiment of the present invention, the similar document search is performed by calculating an inner product of an input vector and a document vector, the input vector having an array of a score of each of terms in a sentence included in the acquired information, the document vector having an array of a score of each of terms in each document included in the accumulated content.

According to an embodiment of the present invention, the search is transitioned from the domain document search to the similar document search as the number of character strings increases.

According to an embodiment of the present invention, in the method, the computer system further causes the at least one agent to present another character string associated with a character string obtained from the acquired information.

According to an embodiment of the present invention, in the method, the computer system further causes the at least one agent to execute the step of presenting any one of a background pattern, a background color, a background image and a background illustration associated with a character string obtained from the acquired information.

According to an embodiment of the present invention, the process of the document creation includes document editing, and the acquired information is a whole or a part of a document in process of editing.

According to an embodiment of the present invention, the process of the document creation includes new document creation, and the acquired information is user information.

Another aspect of the present invention provides a document creation assistance system which allows at least one agent to be registered therein. The method comprises application software to receive user input, an agent to receive information on input performed on the application software by a user, and to search a plurality of contents accumulated in a storage unit on the basis of the received information to retrieve at least one content associated with the received information, and a display section to display the retrieved content on a screen.

Another aspect of the present invention provides a computer program causing a computer to execute each of the steps in the method according to any one of the methods.

Still another aspect of the present invention provides a document creation assistance system which allows at least one agent to be registered therein. The document creation assistance system includes application software configured to receive user input, an agent configured to receive information on input performed on the application software by a user, and to search a plurality of contents accumulated in a storage unit on the basis of the received information to retrieve at least one content associated with the retrieved information, and a display section configured to display the retrieved content on a screen.

According to an embodiment of the present invention, the at least one agent performs the monitoring continuously, searches the multiple contents on the basis of information on additional input by the user obtained by the continuously performed monitoring, and retrieves at least one other content associated with the information on the additional input.

According to an embodiment of the present invention, the at least one agent proposes the retrieved content to the user, and receives an adoption of the proposed content from the user.

According to an embodiment of the present invention, the at least one agent searches the accumulated contents on the basis of the acquired information, and retrieves at least one of document data including a keyword matching the acquired information, or associated with the keyword, a writing style matching the acquired information, a document domain matching the acquired information, background data matching the acquired information, and image data matching the acquired information.

According to an embodiment of the present invention, the at least one agent searches the accumulated contents on the basis of the user information, and retrieves at least one of a document created in the past by the user, a writing style created in the past by the user, a domain of a document created in the past by the user, background data created in the past by the user, and image data created in the past by the user.

According to an embodiment of the present invention, the at least one agent makes one or more candidate terms selectable for a changeable area when the retrieved content is a document having the changeable area.

According to an embodiment of the present invention, the at least one agent retrieves a content created in the past from the accumulated contents.

According to an embodiment of the present invention, the at least one agent creates a new content from the information on the input in response to an acquisition of the information on the input.

According to an embodiment of the present invention, the at least one agent performs a domain document search, a similar document search or a combination search of the two searches from the accumulated contents on the basis of one or more character strings obtained from the acquired information.

According to an embodiment of the present invention, when the combination search of the domain document search and the similar document search is performed, the at least one agent selects a content by assigning weights to a result of the domain document search and a result of the similar document search, the weights depending on the number of the character strings.

According to an embodiment of the present invention, the at least one agent presents another character string associated with a character string obtained from the acquired information.

According to an embodiment of the present invention, the at least one agent presents a document domain associated with a character string obtained from the acquired information.

According to an embodiment of the present invention, the at least one agent presents any one of a background pattern, a background color, a background image and a background illustration associated with a character string obtained from the acquired information.

BRIEF DESCRIPTION OF DRAWINGS

For a more complete understanding of the present invention and the advantage thereof, reference is now made to the following description taken in conjunction with the accompanying drawings.

FIG. 4A shows, as an embodiment of the present invention, an example of tables on the database constructed in the storage unit (130) in FIG. 1A, the table being used when the domain search is executed in step 316 in FIG. 3B.

FIG. 4D shows, as an embodiment of the present invention, an example of a table on a database constructed in the storage unit shown in FIG. 1A and used when the similar document search is executed in step 316 in FIG. 3B.

FIG. 7H shows the screen in which the similar document is proposed according to an embodiment of the present invention.

FIG. 7L shows an example in which the adopted similar document is displayed in the editor screen according to an embodiment of the present invention.

DETAILED DESCRIPTION OF THE PREFERRED EMBODIMENTS

Figure 1A:
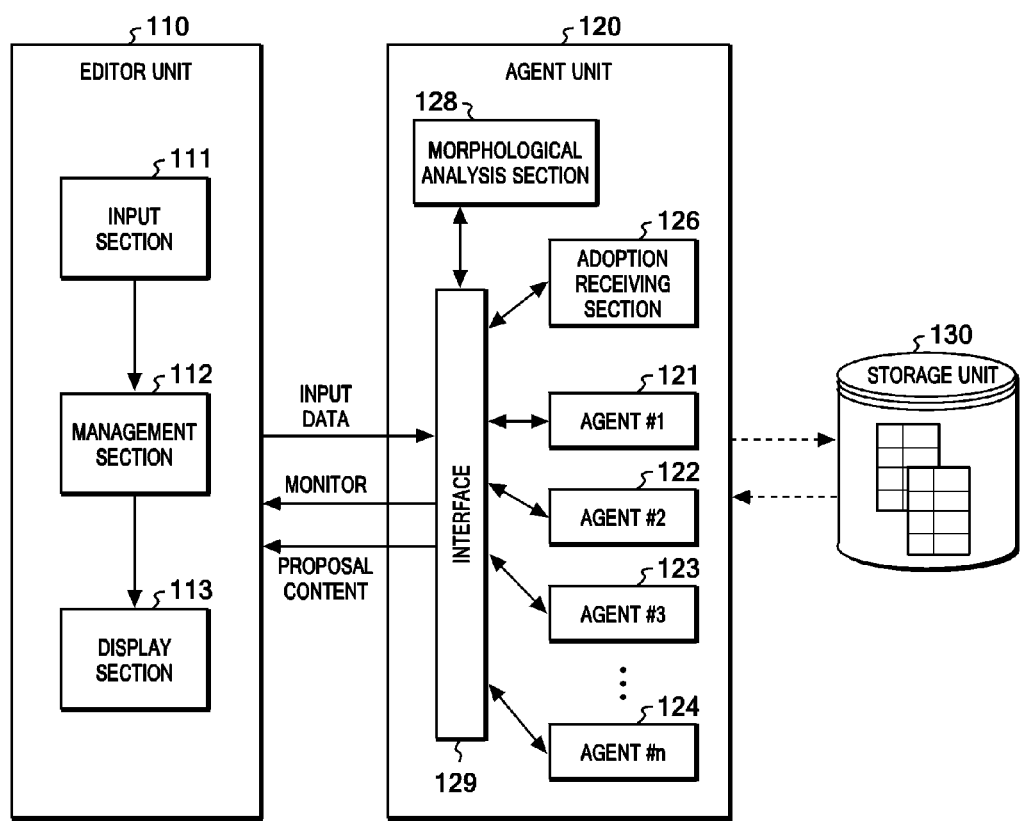
FIG. 1A shows a block configuration diagram of a document creation assistance system (100) according to an embodiment of the present invention.

In the embodiments of the present invention, "a document" denotes data newly creatable or editable by a user. The data may be, for example, text data, e-mail send data, spread sheet data, image data, music data, video data, or data in a database, or may be any type of data other than these.

In the embodiments of the present invention, "a process of document creation" is a process of a series of input operation performed by a user on application software for creating the document. Examples of the process of document creation may include startup of document creation application software such as editor software, for example, new creation or reading of a file, input of text data into document creation application software, insertion of a drawing, creation of background, creation of background music, file save, or shutdown of document application software, or may be any type of input operation other than these.

In the embodiments of the present invention, "user input" is an action taken by a user on the document creation application software through an input device. The input device may be one or a combination of a keyboard, a mouse, and an audio input device such as a microphone, for example, or may be any device other than these. The action may be new creation of a document, making a change in a document, or input of a document, or may be any action other than these. The action may include making a response for content selection which will be described later.

In the embodiments of the present invention, "input information" is information of a whole or a part of an action from the input device at a time of the input operation. The information may be a text string or an input amount of characters, for example. The "input information" may be user information. The user information is personal information about a user. More specifically, the user information may be a user ID, a document creator user ID, or a document identifier, for example, which is associated with the application software or a computer system in which the application software is installed. In addition, the user information may be information for identifying past document creation history or a communication partner.

In the embodiments of the present invention, a "content" is a whole or a part of proposed content. The content may be, for example, document data including or associated with a keyword matched with acquired information, a writing style matching the acquired information, document domain matching the acquired information, background data (for example, a background color or a background image) matching the acquired information, and image data matching the acquired information. In addition, the content may be, for example, a document created by the user in the past, a writing style of a document created by the user in the past, a document domain of a document created by the user in the past, background data created by the user in the past or image data created by the user in the past. The content may be a combination of two or more of the aforementioned contents.

In the embodiments of the present invention, "content selection" means a determination on whether or not a user adopts a proposed content during editing process. The user may select the proposed content as a whole, or select a choice for a changeable area included in the proposed content.

In the embodiments of the present invention, an "agent" means a computer program to autonomously propose a content to a user for document creation assistance. The agent proposes a content, for example, proposes a sentence, writing style, domain, music or background. The agent autonomously proposes aforementioned various contents to the user without receiving any instruction specifying a content to be proposed. An embodiment can be implemented in such a manner that a single agent proposes all the above contents or that multiple agents propose respective types of the above contents. The agent can be incorporated as add-in software into application software for document creation. Instead, the agent can be executed as an external program out of the application software. The agent may be executed on a computer on which document creation application software is running, or may be executed on a different computer connected through a network to a computer on which document creation application software is running. In addition, the agent may be registered in advance in the application software or may be additionally registered in the application software by a user.

In the embodiments of the present invention, "document data" is a document created in the past by a user or other people, a template document, or any document other than these. The document data may include a changeable area for which a user is allowed to select terming. The document data includes characters expressible as a document in accordance with each language, an image, format code, or a combination thereof.

In the embodiments of the present invention, a "writing style" is a sentence expression form such as the "de aru" form (plain form), the "desu/masu" form (polite form) and the "gozaimasu" form (more polite form) mostly expressed by the last term in the end of a sentence. The "writing style" includes expressions with an honorific term, a polite term, a humble term, an imperative term, and a dialectal term, for example.

In the embodiments of the present invention, a "document domain" means a type of document. The types of documents include, for example, a document for e-mail, a document for business, a document for personal use, a document for ceremonial occasion, and documents for purposes other than these.

In the embodiments of the present invention, "background data" is data displayed as a background in a document. The background data includes, for example, a background color, a background pattern, data of a background image, a background illustration, a combination thereof, and any types of backgrounds other than these.

In the embodiments of the present invention, "domain document search" is a search method in which the agent determines from which document domain a document is to be retrieved, and searches accumulated contents to retrieve a document belonging to the determined domain. The document domain is each of groups into which multiple documents to be retrieved are classified in accordance with the descriptions of the documents. A domain name is a name of the group. A single document may belong to two or more domains.

In the embodiments of the present invention, a "similar document search" is a search in which a document similar to a document currently being inputted by a user is retrieved from the accumulated contents. Here, a document similar to a certain document is, for example, a document which is mostly the same as the certain document while using synonymous terms in some parts, a document which is the same as the certain document except for including different character strings determining the writing style, or any other types of similar documents.

In the embodiments of the present invention, the "similar document search" and the "domain document search" can be performed simultaneously. In the execution of the search, the "domain document search" is mainly performed when a document includes a small number of characters, and then the "similar document search" becomes mainly performed instead of the "domain document search" as a data amount inputted by a user increases.

In the embodiments of the present invention, "application software" is software used to create the document. The application software is, for example, editor software, term processor software, spreadsheet software, drawing software, paint software, DTM software, or any software other than theses.

In the embodiments of the present invention, "new document creation" is an instruction that a user issues to create a new document after starting up the application software. This is not an instruction that the user issues to the agent assist input. One of specific features of the embodiments of the present invention is that a user does not have to issue an instruction for input assistance. If the application software enters a new document mode upon start-up, the user does not have to instruct the agent to create a new document.

Hereinafter, the embodiments of the present invention will be described with reference to the accompanying drawings. It should be understood that the embodiments are intended only to explain preferred modes of the present invention, and are not intended to limit the scope of the present invention. Throughout the drawings, the same reference numerals denote the same elements unless otherwise noted.

FIG. 1A shows a block configuration diagram of a document creation assistance system (100) according to an embodiment of the present invention. The document creation assistance system (100) includes an editor unit (110), an agent unit (120) and a storage unit (130).

The editor unit (110) includes an input section (111), a management section (112) and a display section (113). The editor unit (110) is application software having functions to manage documents and create documents. The functions include new document file creation, document input, document deletion, document copy, document paste, document search, document replacement, document formatting, document file save, and functions other than these.

The input section (111) includes any one or a combination of input devices such as a keyboard, a mouse, for example, and a voice input device. The input section (111) passes an input received through the input device from the user, to the management section (112). The input from the user includes, for example, characters inputted to create a document, an instruction for new document file creation, and other types of inputs. The input from the user also includes replies to proposals from agents #1 to #n (121 to 124) which will be described later. The replies include a reply indicating that the user adopts a proposal from the agent, a reply indicating that the user does not adopt a proposal from the agent, a reply indicating that the user selects a choice for a changeable area in a proposal from the agent, and replies other than these.

Upon receipt of an input transmitted from the input section (111), the management section (112) executes a function corresponding to the input. When the input is an input of characters to be added to a document, for example, the management section (112) adds the characters to the document. When the input is an instruction to create a new document file, for example, the management section (112) creates a new document file. When the input is a reply to a proposal from any of agents #1 to #n (121 to 124), for example, the management section (112) transmits the reply to the agent unit (120). The management section (112) transmits display information to the display section (113). The display information includes at least one of a document in process of creation, a proposal from at least one of the agents #1 to #n (121 to 124,) and an execution result of the function corresponding to an input from the user.

The display section (113) receives the display information from the agent unit (120) directly or through the management section (112). The display section (113) displays the display information on a display device, for example.

The editor unit (110) transmits input data to the agent unit (120). The input data includes at least one of a part or a whole of the input, the input information, and a part or a whole of a document in process of creation. Alternatively, the agent unit (120) may be configured to monitor a change in a document, and to cause the editor unit (110) to transmit the input data every time the document is changed. The editor unit (110) transmits the input data to the agent unit (120) in response to a data input from the user, and the agent unit (120) enables the agents #1 to #n (121 to 124) to autonomously propose contents upon receipt of the input data. In this way, the user can receive a document creation assistance from at least one of the agents #1 to #n (121 to 124) without performing an operation to ask the document creation assistance.

The agent unit (120) includes at least one of the agent #1 (121), the agent #2 (122), the agent #3 (123) and the agent #n (124). The agent unit (120) includes, as options, a morphological analysis section (128), an adoption receiving section (126) or an interface (129).

The agents #1 to #n (121 to 124) each have a function to autonomously propose a content to the user without receiving an instruction from the user. The proposal is made based on at least one of the input data transmitted from the editor unit (110), a local document which will be described later, and an analysis result (a morpheme, for example) transmitted from the morphological analysis section (128). The agent unit (120) may also transmit the input data or the local document received through the interface (129) to the morphological analysis section (128).

The morphological analysis section (128) morphologically analyzes the transmitted input data or local document, and thereby divides the input data or local document into morphemes. The morphological analysis section (128) can transmit a result of the morphological analysis to each of the agents #1 to #n (121 to 124). Here, the morphological analysis section (128) may be included in each of the agents #1 to #n (121 to 124).

The agent unit (120) causes each of the agents #1 to #n (121 to 124) to propose a content based on the input data, the local document or the result from the morphological analysis section (128). The agent unit (120) causes the agents #1 to #n (121 to 124) to access the storage unit (130), and to retrieve the contents. In the search, the agents #1 to #n (121 to 124) can use the input data, the local document or the result from the morphological analysis section (128), for example. The agents #1 to #n (121 to 124) can use, as a content to be proposed (hereinafter, called a proposal content), the content thus retrieved, or a content obtained based on the retrieved content and a given calculation formula. The agent unit (120) can also register the input data in the local document. The agent unit (120) may cause the agents #1 to #n (121 to 124) to store, in the storage unit (130), the input data, the result from the morphological analysis section (128), and the proposal content, as a new content or information on the content.

The agent unit (120) and the agents #1 to #n (121 to 124) may be collectively called a search unit with attention focused on the search functions respectively held by them. The search unit measures the similarity of the retrieved content to the document included in the input data or the local document, for example. When the similarity exceeds a predetermined threshold, the search unit transmits the retrieved content to the editor unit (110) as a proposal content. The predetermined threshold is set to an appropriate value in advance. The proposal content is, for example, a similar document, a template document, a writing style of the document, a background color of the document, and any type of content other than these. Moreover, the search unit may perform the search, for example, only within documents created by the user in the past according to a user ID, for example, which is user information. The user information may be included in the input information included in the input data.

The interface (129) mediates reception and transmission of information between the editor unit (110) and the agent unit (120). The interface (129) also controls information transfer between each of the agents #1 to #n (121 to 124) and the morphological analysis section (128). The interface (129) may further control timings of causing each of the agents #1 to #n (121 to 124) to execute the search and issue a proposal. Additionally, the interface (129) may select one or more of the multiple agents and cause the selected agents to perform operation.

The adoption receiving section (126) receives from the user an instruction on whether to adopt or refuse the proposed content. When no instruction is received for a certain time period, the adoption receiving section (126) may recognize that the user makes an instruction indicating the refusal of the proposed content. Here, the adoption receiving section (126) may be included in each of the agents #1 to #n (121 to 124).

The storage unit (130) stores various types of contents and various types of information necessary for the search. The storage unit (130) is, for example, a memory, a hard disk, or any type of storage other than these. The various types of contents and the various types of information may be held in a table or file of a database on the hard disk, for example. The storage unit (130) provides a content based on the search performed from the agent unit (120).

Incidentally, the editor unit (110), the agent unit (120) and the storage unit (130) may be implemented either on a single computer, for example, a personal computer, or on multiple computers arranged to be distributed through a network. A to-be-installed part of each of the agents #1 to #n (121 to 124) may be installed on a computer different from a computer on which the agent unit (120) is implemented. When an agent is installed on the different computer, the agent can be a component provided through a Web service or COM, for example.

Figure 1B:
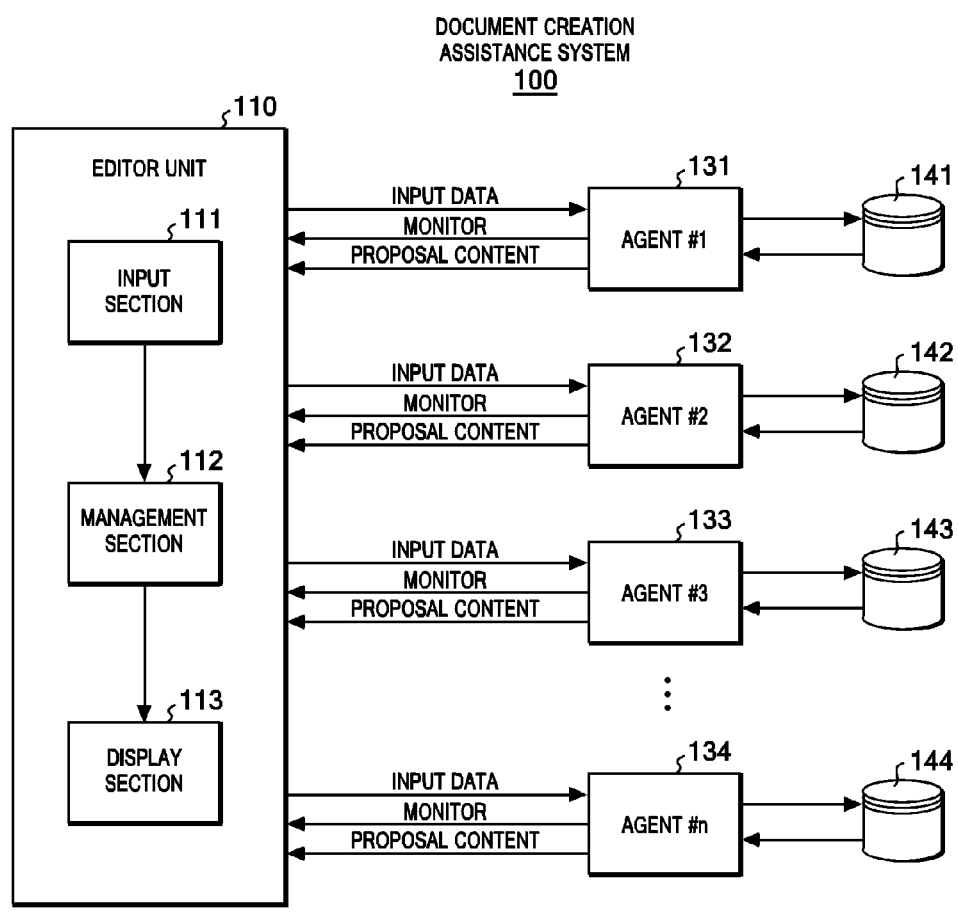
FIG. 1B shows another example of a block configuration diagram of a document creation assistance system according to another embodiment of the present invention, which is different from the block configuration diagram of the document creation assistance system shown in FIG. 1A.

FIG. 1B shows another example of a block configuration diagram of a document creation assistance system according to another embodiment of the present invention, which is different from the block configuration diagram of the document creation assistance system shown in FIG. 1A. A document creation assistance system (100) includes an editor unit (110), agents #1 to #n (131 to 134) and a storage unit (141 to 144).

The editor unit (110), an input section (111), a management section (112), and a display section (113) are the same as those described with reference to FIG. 1A.

The agents #1 to #n (131 to 134) each have a function to autonomously propose a content without receiving any instruction from the user. The proposal is made based on at least one of: the input data transmitted from the editor unit (110); and a local document. The agents #1 to #n (131 to 134) access their corresponding storage units (141 to 144), respectively, and search for the contents. In the search, the agents #1 to #n (131 to 134) can use the input data and the local document, for example. When the agents #1 to #n (131 to 134) each have a function of morphological analysis, the agents #1 to #n (131 to 134) may morphologically analyze the input data or the local document, and may perform the search by using the analysis result. The agents #1 to #n (131 to 134) each determine as a proposal content a retrieved content or a content obtained based on the retrieved content and a given calculation formula. The agents #1 to #n (131 to 134) each can register the input data in the local document. The agents #1 to #n (131 to 134) may each store, as a new content or information on the content, the input data, the morphological analysis result and the proposal content in a corresponding one of the storage units (141 to 144).

The agents #1 to #n (131 to 134) each measure the similarity of the retrieved content to the document included in the input data or the local document, for example. When the similarity exceeds a predetermined threshold, each of the agents #1 to #n (131 to 134) transmits the retrieved content to the editor unit (110) as a proposal content. The predetermined threshold is set to an appropriate value in advance. The proposal content is, for example, a similar document, a template document, a writing style of the document, a background color of the document, and any type of content other than these. Moreover, each of the agents #1 to #n (131 to 134) may perform the search only within documents created by the user in the past, for example, according to a user ID, for example, that is user information. The user information may be included in the input information included in the input data.

Each of the agents #1 to #n (131 to 134) may have an adoption receiving function (equivalent to the adoption receiving section in FIG. 1A). The adoption receiving function is a function to receive from the user an instruction on whether to adopt or refuse the proposed content. When no instruction is received for a certain time period, each of the agents #1 to #n (131 to 134) may recognize that the user makes an instruction indicating the refusal of the proposed content.

Each of the storage units (141 to 144) stores various types of contents and various types of information necessary for the search. Each of the storage units (141 to 144) may store the local document. Each of the storage units (141 to 144) is, for example, a memory, a hard disk, or any type of storage other than these. The various types of contents and the various types of information may be held in a table or file of a database on the hard disk, for example. The storage units (141 to 144) provide contents based on the searches performed from the corresponding agents #1 to #n (131 to 134), respectively.

Incidentally, the editor unit (110), the agents #1 to #n (131 to 134) and the storage units (141 to 144) may be implemented either on a single computer, for example, a personal computer, or on multiple computers arranged to be distributed through a network.

Figure 1C:
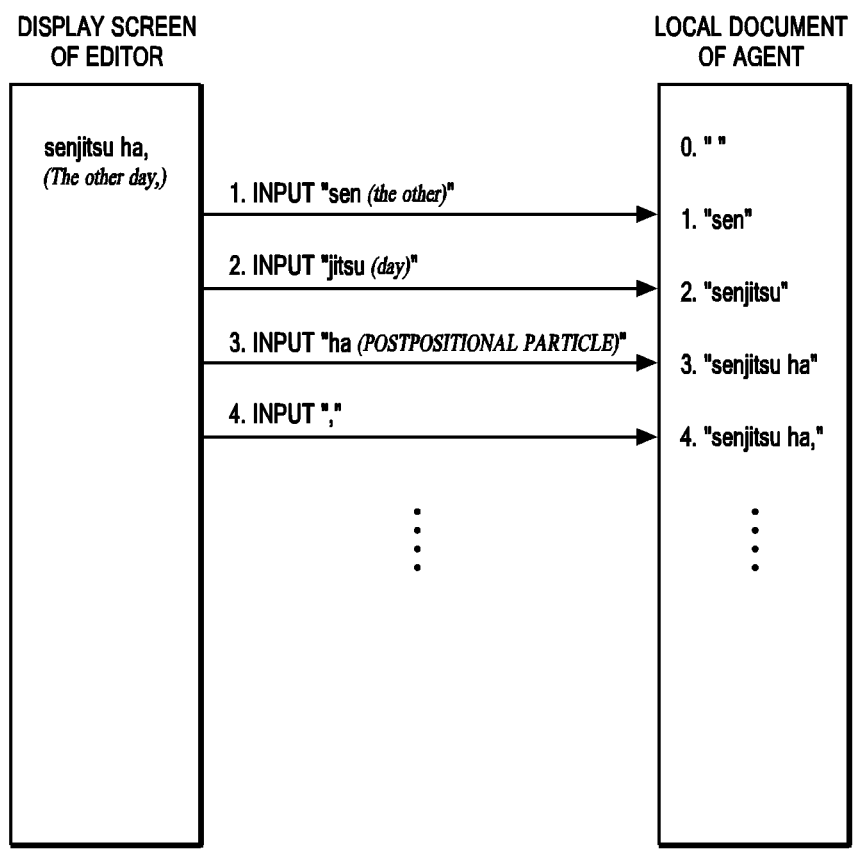
FIG. 1C shows an example of a local document managed by an agent unit shown in FIG. 1A or agents shown in FIG. 1B.

FIG. 1C shows an example of a local document managed by the agent unit (120) shown in FIG. 1A or the agents #1 to #n (131 to 134) shown in FIG. 1B. The local document may be prepared for each agent or may be collectively prepared for multiple agents. The local document is a document stored in the storage unit (130) or each of the storage units (141 to 144) respectively prepared for the multiple agents #1 to #n (131 to 134). The local document may be managed separately from a document in process of editing on the editor unit (110) (such a document is called a user document, below). Instead, the user document may also be used in common as local document. Hereinafter, description will be provided for how the text in the local document is changed while the user document is in process of editing. When the user starts editing the user document, the local document is not prepared yet.

Step 1. When the user inputs "sen (the other)" to the input section (111), the editor unit (110) issues to the agent unit (120) an input event in which the user inputs "sen". The agent unit (120) receives the "sen" inputted in the event as input data. The agent unit (120) stores the received "sen" as the local document.

Step 2. When the user inputs "jitsu (day)" to the input section (111), the editor unit (110) issues to the agent unit (120) an input event in which the user inputs "jitsu". The agent unit (120) receives the "jitsu" inputted in the event as input data. The agent unit (120) adds the received "jitsu" to the "sen" which is already stored as the local document, and stores the added phrase "senjitsu (the other day)" as the local document.

Step 3. When the user inputs "ha (a postpositional particle of Japanese)" to the input section (111), the editor unit (110) issues to the agent unit (120) an input event in which the user inputs "ha". The agent unit (120) receives the "ha" inputted in the event as input data. The agent unit (120) adds the received "ha" to the "senjitsu" which is already stored as the local document, and stores the added phrase "senjitsuha (the other day)" as the local document.

Step 4. When the user inputs "," to the input section (111), the editor unit (110) issues to the agent unit (120) an input event in which the user inputs ",". The agent unit (120) receives the "," inputted in the event as input data. The agent unit (120) adds the received "," to the "senjitsuha" which is already stored as the local document, and stores the added phrase "senjitsuha," as the local document.

The local document can be changed in synchronization with the user document through the above steps 1 to 4.

Figure 2:
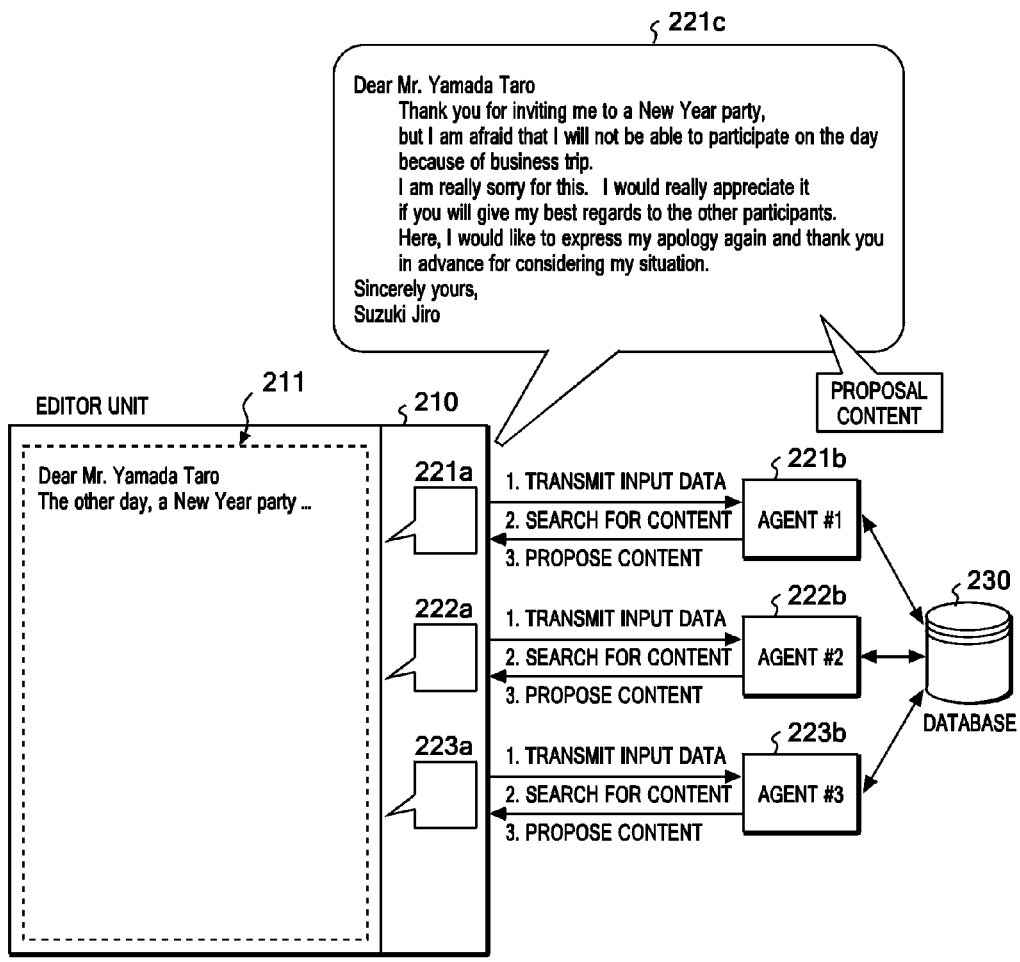
FIG. 2 shows an overview of a content proposal made by the document creation assistance system shown in FIG. 1A according to an embodiment of the present invention.

FIG. 2 shows an overview of a content proposal made by the document creation assistance system (100) shown in FIG. 1A according to an embodiment of the present invention. A screen (210) shows an example of display by document creation application software (called an editor, below). The screen (210) is a screen showing that the agent autonomously proposes a content while the user is inputting text to a document. In the screen (210), the document in process of creation by the user, i.e., "Dear Mr. Yamada Taro, The other day, a new year party . . . " is displayed. In addition, icons (221a to 223a) corresponding to the agents #1 to #3 (221b to 223b) are displayed in this order from the upper side of the screen (210). The agent #1 (221b) is, for example, an agent to propose a similar or domain document. The agent #2 (222b) is, for example, an agent to propose a background. The agent #3 (223b) is, for example, an agent to propose a writing style. A proposal (221c) is a document proposed by the agent #1 (221b). The proposal (221c) is displayed in a balloon form, for example, drawn from the icon (221a) corresponding to the agent #1 (221b) and located in the uppermost position. With this display, the user can know that a document similar to the document in process of creation is proposed. When the user adopts the proposal (221c), the user drags and drops the proposal to a document edit screen (211), for example. The user may make the adoption by pressing down a predetermined key in the keyboard, for example. Instead, if the document creation assistance system is provided with a voice input device, the user may make the adoption by giving a voice instruction indicating the adoption. When the user does not adopt the proposal (221c), the user gives the agent #1 (221b) any type of instruction indicating the refusal of the adoption. The user may instruct the refusal by pressing down a predetermined key in the keyboard, for example. Instead, when no instruction indicating the refusal is given, the agent #1 (221b) may cancel the proposal (221c) after a lapse of a predetermined time period, for example. The active icon (221a) and the inactive icons (222a and 223a) may be made distinguishable from each other by different colors, for example.

The operation, described in the foregoing overview, which involves making a proposal for a document in process of creation and receiving an instruction indicating the adoption or refusal of the proposal is performed in the following procedure.

a. The document creation assistance system (100 in FIG. 1A) causes the agent #1 (221b) to acquire through the editor the document in process of creation.

b. The document creation assistance system (100) causes the agent #1 (221b) to analyze the acquired document in process of creation.

c. The document creation assistance system (100) causes the agent #1 (221b) to retrieve a proposal document from the database (230) by using the analyzed document.

d. The document creation assistance system (100) causes the agent #1 (221b) to transmit the retrieved proposal document to the editor. By means of the transmission, the agent #1 (221b) proposes the proposal document to the user.

e. The user inputs a determination result, indicating the adoption or refusal of the proposed document, to the input section (111 in FIG. 1A). The input is transmitted to the editor and the agent #1 (221b). Instead, in response to the fact that no instruction indicating the adoption or refusal of the proposal document is given for a predetermined time period, the editor and the agent #1 (221b) are notified of the refusal of the proposed document.

Figure 3A:
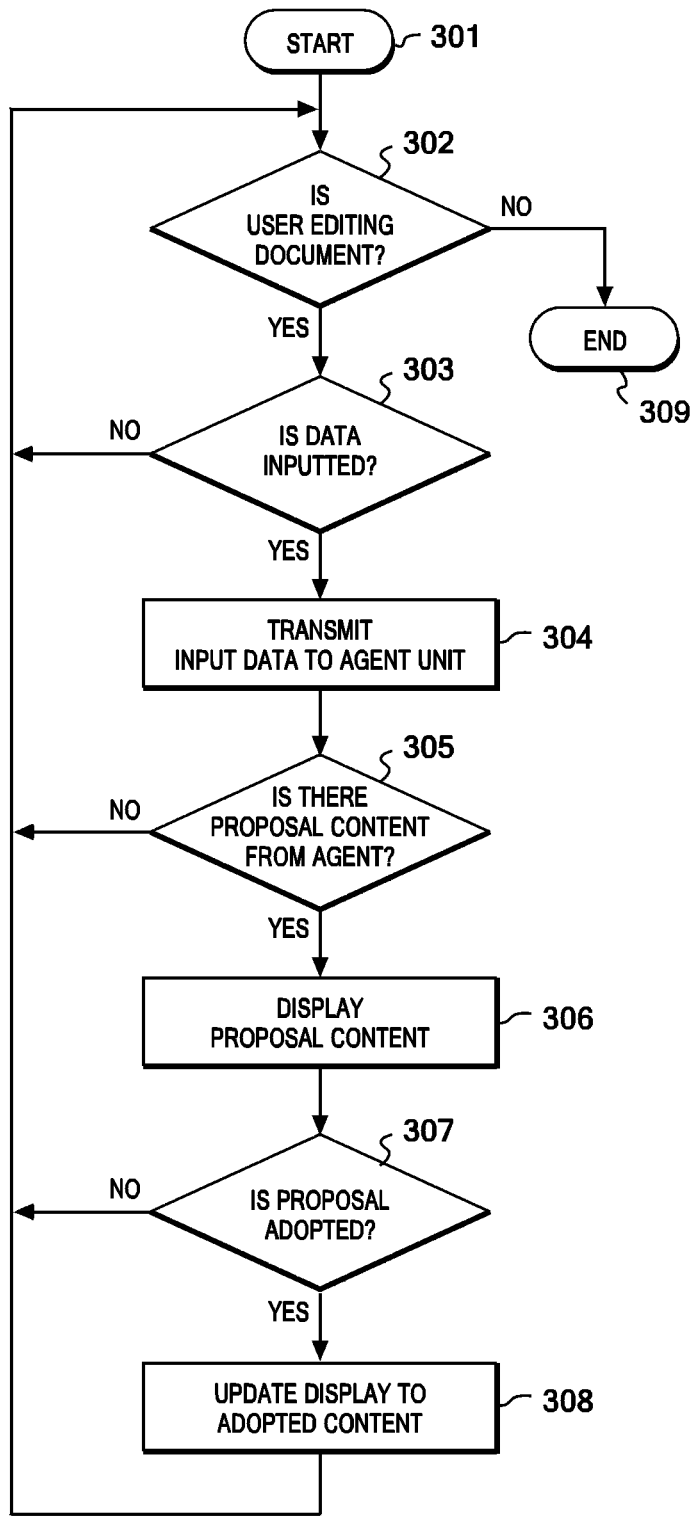
FIG. 3A shows a flow chart of a basic operation of an editor unit shown in FIG. 1A according to an embodiment of the present invention.

FIG. 3A shows a flow chart of a basic operation of the editor unit (110) shown in FIG. 1A according to an embodiment of the present invention. Note that the editor unit (110) performs the undermentioned processing in step 305 to step 308 for a single agent. When there are multiple agents, the processing in step 305 to step 308 may be executed in parallel for all the agents.

In step 301, the editor unit (110) starts the operation. In response to the start of the operation, the editor unit (110) may acquire user information, information on the agents, or a document in process of creation, for example. The editor unit (110) may acquire the user information from, for example, the log-in information of an operating system or the application software, or the registry. The user information may be used as input data transmitted to the agents, or information based on which the agent unit (120 in FIG. 1A) selects an agent. The agent unit (120 in FIG. 1A) automatically selects an agent to be used, by using the user information or the document in process of creation. In an example of the automatic selection, the agent unit (120) may search the storage unit (130 in FIG. 1A) by using the user information, for example, and select an agent which proposed a content in the past. In another example, the agent unit (120) may select an agent which makes a proposal for, for example, the writing style used in the document in process of creation. In still another example, the agent unit (120) may select an agent to be used by a certain agent. In addition, the editor unit (110) displays the document in process of creation on the display section (113 in FIG. 1A). The editor unit (110) may also display the icons of the agents on the display section (113). After these items are displayed, the processing moves to step 302.

In step 302, the editor unit (110) determines whether the user is editing the document. In the determination, the editor unit (110) determines, for example, whether the user has performed an operation for shutting down the editor unit (110). When the user is editing the document, the processing moves to step 303. When the user is not editing the document, the processing moves to step 309 and is terminated.

In step 303, the editor unit (110) determines whether the user has inputted data. The data is, for example, a character to be added to the document, an instruction to create new document file, a replay to a proposal from the agent, or any type of data other than these. In the determination on whether the user has inputted, the editor unit (110) determines whether any type of input operation is performed on the input section (111 in FIG. 1A). When the input has been performed, the processing moves to step 304. When no input has been performed, the processing returns to step 302. Here, whether the data has been inputted may be determined not only at a timing subsequent to step 302, but also at another timing.

In step 304, the editor unit (110) transmits the input data to the agent unit (120 in FIG. 1A) through the interface (129 in FIG. 1A). In addition to or instead of the input data, the editor unit (110) may transmit at least one of information on the input data and the document in process of editing to the agent unit (120 in FIG. 1A) through the interface (129 in FIG. 1A).

Here, the timing of this transmission is not limited to a time point immediately after step 303, but may be another time point. For example, the agent unit (120) may regularly request the editor unit (110) to transmit input data, and the editor unit (110) may perform the transmission upon receipt of the request. Instead of the transmission, the agent unit (120) may acquire the input data. The case where the agent unit (120) acquires the input data will be explained in the following description of FIG. 3B. Here, a new agent may be added to the agent unit (120) by using the same data as the transmitted data. For the case of adding an agent, the editor unit (110) may add an agent to make a proposal about the writing style used in the document in the transmitted data. When an agent is added, the editor unit (110) displays the icon of the added agent on the display section (113).

In step 305, the editor unit (110) determines whether a proposal content has been transmitted from at least one agent included in the agent unit (120). When the proposal content has been transmitted, the processing moves to step 306. When no proposal content has been transmitted, the processing returns to step 302.

In step 306, the editor unit (110) displays the proposal content on the display section (113). After the content is displayed, the processing moves to step 307.

In step 307, the editor unit (110) receives the adoption of the displayed content from the user. To be more precise, upon receipt of an instruction indicating the refusal of the proposal from the user, or upon lapse of a predetermined time period without any instruction being received from the user, the editor unit (110) determines that the user refuses the displayed content. When the editor unit (110) determines that the content is refused, the processing returns to step 302. Instead, upon receipt of an instruction indicating the adoption of the proposal from the user, the editor unit (110) determines that the user adopts the displayed content. When the editor unit (110) determines that the content is adopted, the processing moves to step 308.

In step 308, the editor unit (110) updates the document in process of editing displayed on the display section (113) to the document in accordance with the proposed content. After the update, the processing returns to step 302.

In step 309, the editor unit (110) terminates the processing. The editor unit (110) issues a termination request to the agent unit (120), and terminates the processing. The editor unit (110) may wait for a completion notification as a replay to the termination request.

Figure 3B:
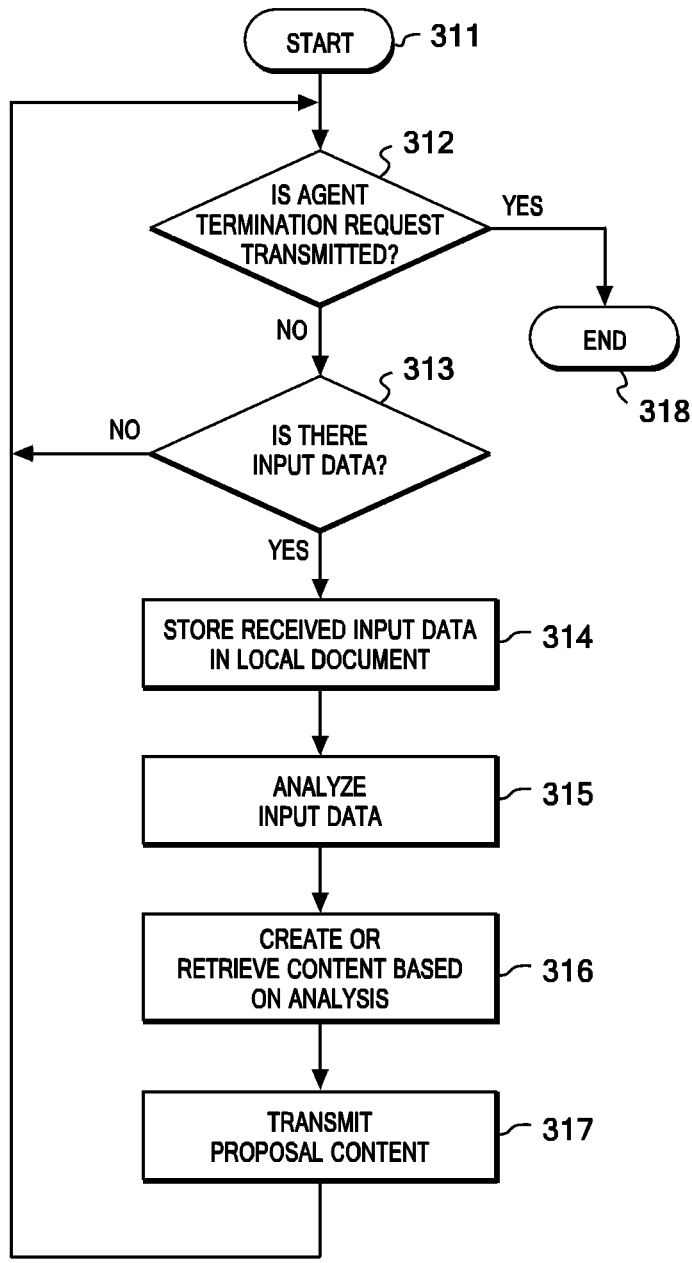
FIG. 3B shows a flow chart of a basic operation of the agent unit shown in FIG. 1A according to an embodiment of the present invention.

FIG. 3B shows a flow chart of a basic operation of the agent unit (120) shown in FIG. 1A according to an embodiment of the present invention. Note that the agent unit (120) performs the undermentioned processing in step 313 to step 317 for a single agent. When there are multiple agents, the processing in step 313 to step 317 may be executed in parallel for all the agents. In addition, an agent can be added or deleted at any timing on the basis of input data transmitted from the editor unit (110). In an example of the case of adding or deleting an agent, the agent unit (120) may add or delete an agent when the input information in the input data includes an instruction to add or delete the agent, for example. In another example, the agent unit (120) may add an agent to make a proposal about the writing style used in the document in process of creation included in the input data transmitted from the editor unit (110).

In step 311, the agent unit (120) starts the operation. The agent unit (120) starts the operation in response to, for example, the startup of the editor unit (110).

In step 312, the agent unit (120) determines whether an agent termination request has been transmitted from the editor unit (110). The termination request can be issued from the editor unit (110) upon execution of the operation in step 309 in FIG. 3A. If the termination request has not been made, the processing moves to step 313. On the other hand, if the termination request has been transmitted, the agent unit (120) terminates the operation of the agents and the processing moves to step 318. The agent unit (120) may transmit a completion notification, for example, as a replay to the termination request to the editor unit (110).

In step 313, the agent unit (120) determines whether there is input data. The input data is transmitted from the editor unit (110) in the processing in step 304. Instead, the agent unit (120) performs a polling operation, for example, as a transmission request to cause the editor unit (110) to transmit the input data. When the input data is transmitted from the editor unit (110), the agent unit (120) receives the input data and the processing moves to step 314. When no input data is transmitted from the editor unit (110), the processing returns to step 312.

In step 314, the agent unit (120) stores the document data in the local document when the received input data includes the document in process of editing or a character to be added to the document (hereinafter, collectively referred to as document data). By storing the data, a part or whole of the document in process of creation on the editor unit (110) by the user can be accumulated in the local document. Upon completion of the storing, the processing moves to step 315.

In step 315, the agent unit (120) analyzes the input data. The agent unit (120) causes the morphological analysis section (in FIG. 1A 128), for example, to analyze a part or whole of the document data accumulated in the local document. As a result of the analysis, the agent unit (120) obtains analyzed morphemes (hereinafter, referred to as a string of terms including morphemes) or a keyword that is a term included in the string of terms. Here, since the morphological analysis can be made by using any technique known to those skilled in the art, detailed explanation of such technique is omitted in this description. In another example, when the user information is included in the input data, the user information can be analyzed. Upon completion of the analysis, the processing moves to step 316.

In step 316, the agent unit (120) creates or retrieves a content on the basis of the analysis. In the case of creating the content, the agent unit (120) creates the content by executing a program logic according to the string of terms or the keyword obtained by the analysis. In the case of retrieving the content, the agent unit (120) may use as a search key the string of terms or the keyword obtained by the analysis. The agent unit (120) retrieves a content by using the search key. In the search, a database on the storage unit (130), for example, is searched. As a result of the search, the agent unit (120) obtains the content. When the agent unit (120) obtains two or more contents, the agent unit (120) may narrow down the contents. The agent unit (120) can narrow down the contents by, for example, measuring the similarity of each of the retrieved contents to a part or whole of document data accumulated in the local document. The agent unit (120) determines that a content having the similarity exceeding a predetermined threshold is the content to be obtained. The threshold can be set to an appropriate value in advance. Upon completion of creating or obtaining the content, the processing moves to step 317.

In step 317, the agent unit (120) transmits, as a proposal content, the created or obtained content to the editor unit (110). After the transmission, the processing returns to step 312.

In step 318, the agent unit (120) terminates the processing.

The flow charts in FIGS. 3A and 3B are applicable also in the document creation assistance system shown in FIG. 1B. In the case of the application in the document creation assistance system shown in FIG. 1B, the editor unit (110) transmits the input data to each of the agents in step 304 in FIG. 3A, for example. The processing of all the steps in the flow chart shown in FIG. 3B is executed in each of the agents.

FIGS. 4A to 4F show an example of structures of data used in the search executed in step 316 in FIG. 3B, and an example of a method of generating the data according to embodiments of the present invention. The following examples are based on the assumptions that the database is constructed in the storage unit (130), and that the data is stored in a table on the database.

As an embodiment of the present invention, FIG. 4A shows an example of tables on the database constructed in the storage unit (130) in FIG. 1A, the table being used when the domain search is executed in step 316 in FIG. 3B.

A domain table (401) is a table in which registered documents are stored by domain name. The domain name is a group name of each of groups into which documents are classified according to the matters dealt with in the documents. The domain names include, for example, greeting, apology, inquiry and New Year greeting card. The registered documents are documents created in the past or documents prepared in advance as templates, for example. The registered documents are, for example, documents 11 to 13, documents 21 to 24, documents 31 to 33, and a document 41. The domain table (401) shows which document domain each document is classified into. For instance, the documents 11 to 13 are classified into the domain named greeting. Here, a single document may be classified into two or more domains. For example, the document 12 is classified into the domain named greeting and a domain named New Year greeting card. Each of the registered documents stored in the domain table (401) can be a content retrieved in step 316 in FIG. 3B.

A domain term table (402) is a table in which terms, domain names and scores are stored. The terms are, for example, "<name>", "san (Mr. or Ms.)" and "ni (a postpositional particle of Japanese)". Here, a specific term may be stored as a term representing an attribute of the specific term (hereinafter, called an attribute name). The attribute name may be, for example, a personal name or a date. According to an embodiment of the present invention, the attribute name is expressed by being enclosed with "<" and ">". For example, the "<name>" indicates the name of a certain person. The score is an indicator indicating the importance of a term in a certain document. Various types of scores can be defined as the score. In an embodiment of the present invention, a TF-IDF value is used as the score. The TF-IDF value is obtained by multiplying a TF (term frequency) value by an IDF (inverse term frequency) value. The TF value is a value indicating an appearance frequency of a term in a certain document. Here, assume that $TF_{ij}$ denotes an appearance frequency of a term j in a document i. The IDF value is an indicator indicating the general importance of a term determined according to a policy in which the term appearing in concentration in a smaller number of documents is regarded as more important. The IDF value is, for example, the logarithm of the reciprocal of a ratio of the number of documents containing the term with respect to the number of all documents. The domain term table (402) stores the score of each term included in each domain. For instance, the score of <name> included in the greeting is 0.7, and the score of <name> included in the apology is 0.7. The domain term table (402) is used when the domain search is executed in step 316 in FIG. 3B. In the domain search, the domain term table (402) may be searched with respect to all the terms in a document included in input data. In the domain search, the scores obtained through the search are summed up, for example, for each domain. In the domain search, a content belonging to a larger number of domains with the high summed up scores may be a content more preferentially proposed.

Figure 4B:
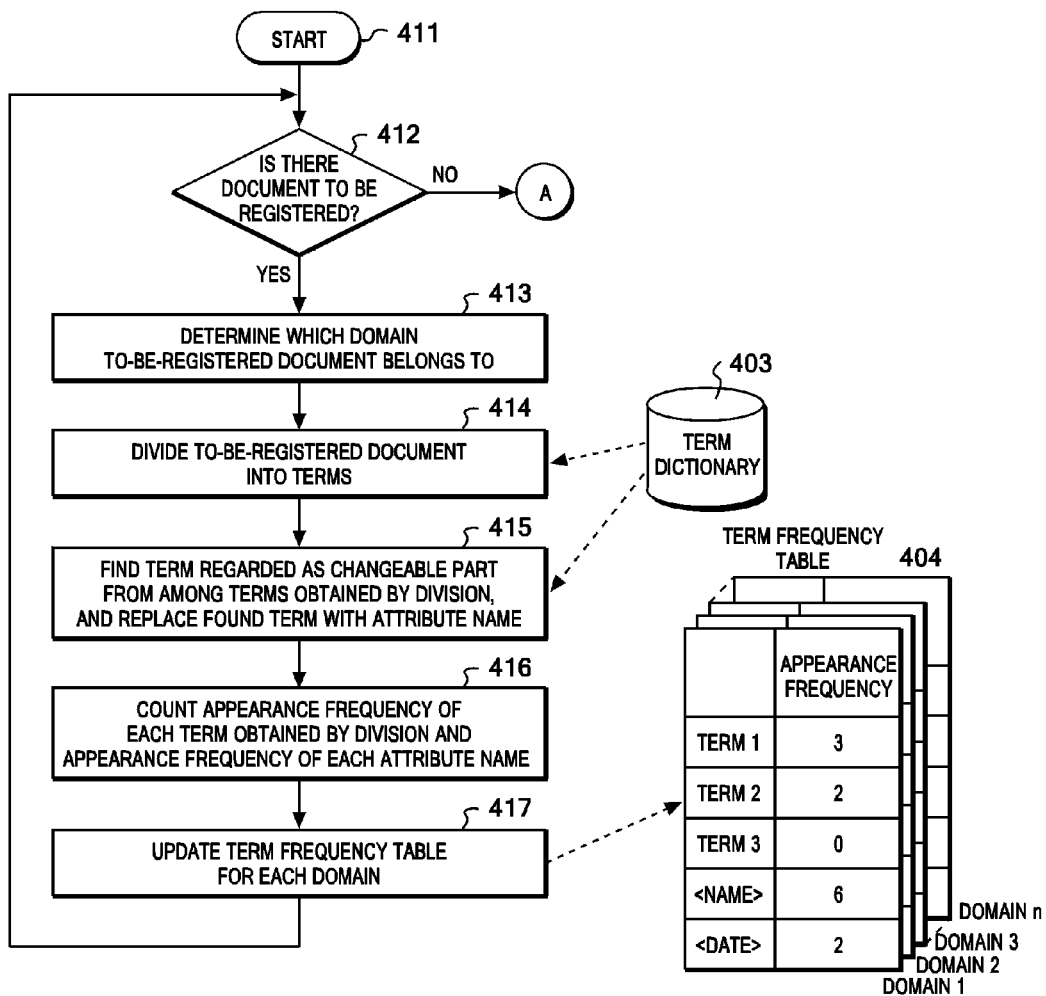
FIG. 4B shows a flow chart for updating a term frequency table of each domain needed to generate the domain term table shown in FIG. 4A, according to an embodiment of the present invention.
Figure 4C:
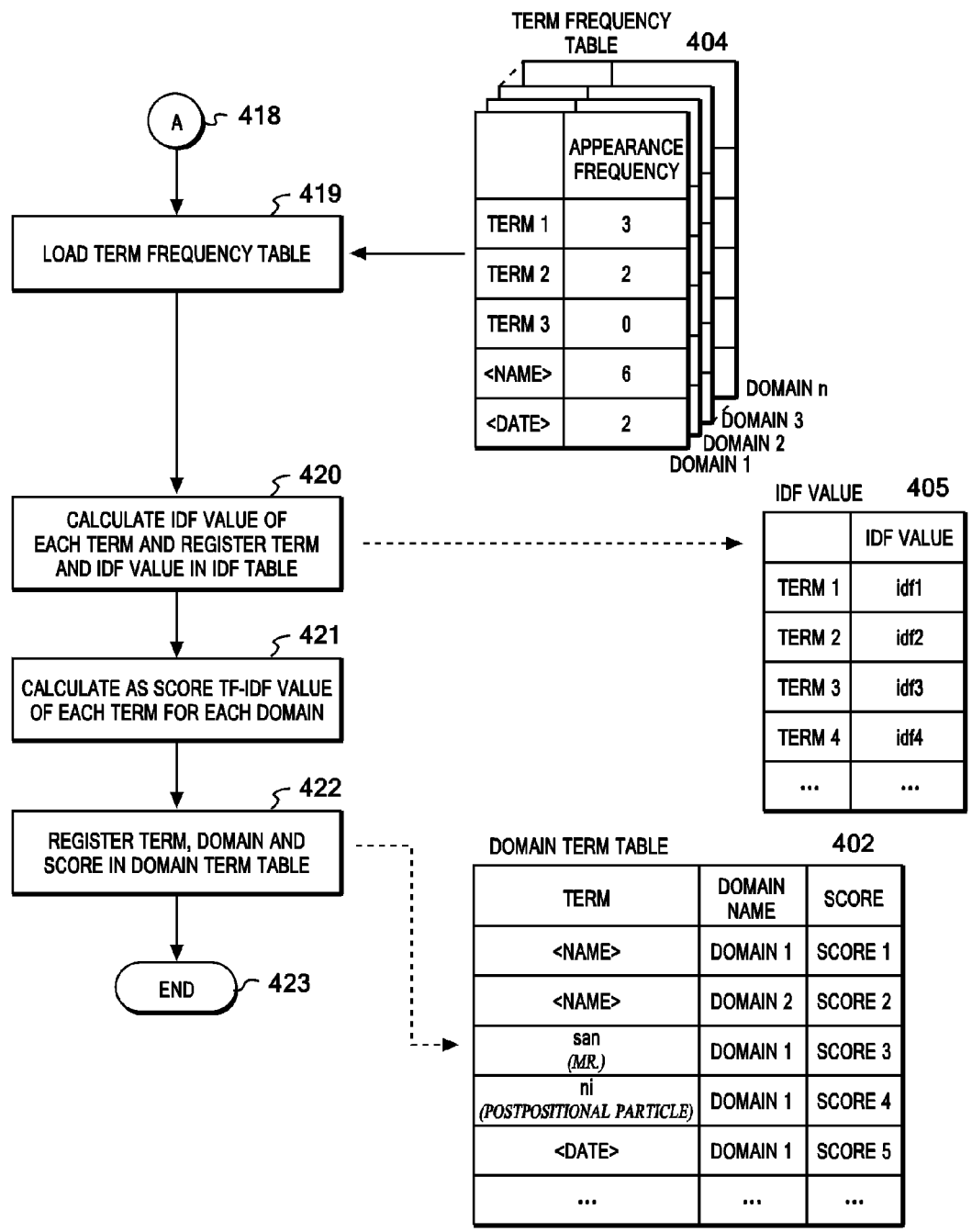
FIG. 4C shows a flow chart for generating the domain term table shown in FIG. 4A according to an embodiment of the present invention.

As embodiments of the present invention, FIGS. 4B and 4C show flow charts for generating the domain term table shown in FIG. 4A.

FIG. 4B shows a flow chart for updating a term frequency table of each domain needed to generate the domain term table shown in FIG. 4A, according to an embodiment of the present invention. In step 411, the agent unit (120 in FIG. 1A) starts generating the domain term table. In step 412, the agent unit (120) checks whether there is one or more documents to be registered in the term frequency table. The document is a part or whole of a document included in the input data and being in process of creation by a user, for example. Instead, the document is a document, for example, prepared in the first place to construct the document creation assistance system. These documents are, for example, an example sentence, a template document, a document created in the past by the user, and any document other than these. When the documents to be registered exist, the agent unit (120) takes out one of the documents to be registered. After the one document is taken out, the processing moves to step 413. When there is no document to be registered, the processing moves to step 418. In step 413, the agent unit (120) determines which domain the taken-out document to be registered belongs to. For example, the agent unit (120) displays a list of domains on a monitor, and prompts the user to determine the domain. Then, the agent unit (120) stores the determined domain and the document to be registered in the domain table (401). After the storing, the processing moves to step 414. In step 414, the agent unit (120) divides the document to be registered into terms. For this division, morpheme analysis may be used, for example. The agent unit (120) morphemically analyzes the document to be registered, and divides the document to be registered into terms by comparing a result of the morphological analysis with terms registered in a term dictionary (403), for example. After the division, the processing moves to step 415. In step 415, the agent unit (120) finds a term regarded as a changeable part from among the terms obtained by the division, and replaces the found term with an attribute name. The term regarded as the changeable part is, for example, a name or a date. When the term obtained by the division is, for example, "Taro Yamada", the agent unit (120) can replace the "Taro Yamada" with "<name>". Instead, when the term obtained by the division is, for example, "5 gatsu 5 nichi (May 5)", the agent unit (120) can replace the "5 gatsu 5 nichi" with "<date>". Information for the replacement is registered in the term dictionary (403), for example, by the user in advance. The user registers "XX gatsu XX nichi (X is a right-aligned numeral value)" and "<date>" as the same term in the term dictionary (403), for example. According to this registration, the agent unit (120) can replace the term "5 gatsu 5 nichi" with the attribute name of "<date>". After the replacement, the processing moves to step 416. In step 416, the agent unit (120) counts the appearance frequency of each term obtained by the division and the appearance frequency of each attribute name. Upon completion of the counting, the processing moves to step 417. In step 417, the agent unit (120) updates a term frequency table (404). The term frequency table (404) is a table in which a set of each term and the counted appearance frequency and a set of each attribute name and the counted appearance frequency are stored for each domain. After the storing, the processing returns to step 412.

FIG. 4C shows a flow chart for generating the domain term table shown in FIG. 4A according to an embodiment of the present invention. Step 418 indicates a linker connecting the flow charts shown in FIGS. 4B and 4C with each other. In step 419, the agent unit (120) loads the entire term frequency table (404) updated in step 417. Upon completion of the loading, the processing moves to step 420. In step 420, the agent unit (120) calculates the IDF value for each term for each domain by using the appearance frequency of the term included in the loaded term frequency table (404). The agent unit (120) registers a set of each term and its IDF value thus calculated in an IDF table (405). Upon completion of the registration, the processing moves to step 421. In step 421, the agent unit (120) calculates the TF value for each term by using the appearance frequency of the term included in the loaded term frequency table (404). The agent unit (120) calculates the TF-IDF value for each term for each domain by using the TF value and the IDF value thus calculated. Upon completion of the calculation, the processing moves to step 422. In step 422, the agent unit (120) registers the terms, domains and scores in the domain term table (402). Here, the score is the TF-IDF value thus calculated. In step 423, the agent unit (120) terminates the generation of the domain term table (402).

As an embodiment of the present invention, FIG. 4D shows an example of a table on a database constructed in the storage unit (130) shown in FIG. 1A and used when the similar document search is executed in step 316 in FIG. 3B. A document term table (406) is a table in which a set of each term and its score is stored for each document. The TF-IDF value, for example, is used as the score. In a document 1, there are stored three sets of terms and scores, for example, of "kyo (today)" and "0.2", of "ha (a postpositional particle of Japanese)" and "0.05", and of "yoi (good)" and "0.3", respectively. The document term table (406) is used when the similar document search is executed in step 316 in FIG. 3B. In the similar document search, the document term table (406) may be searched with respect to all the terms in the document included in the input data, for example. In the similar document search, a set of a term and score thus retrieved is expressed, for example, as an array. In the similar document search, the similarity of the document in the input data can be calculated by calculating the inner product of the array and the document in the input data.

Figure 4E:
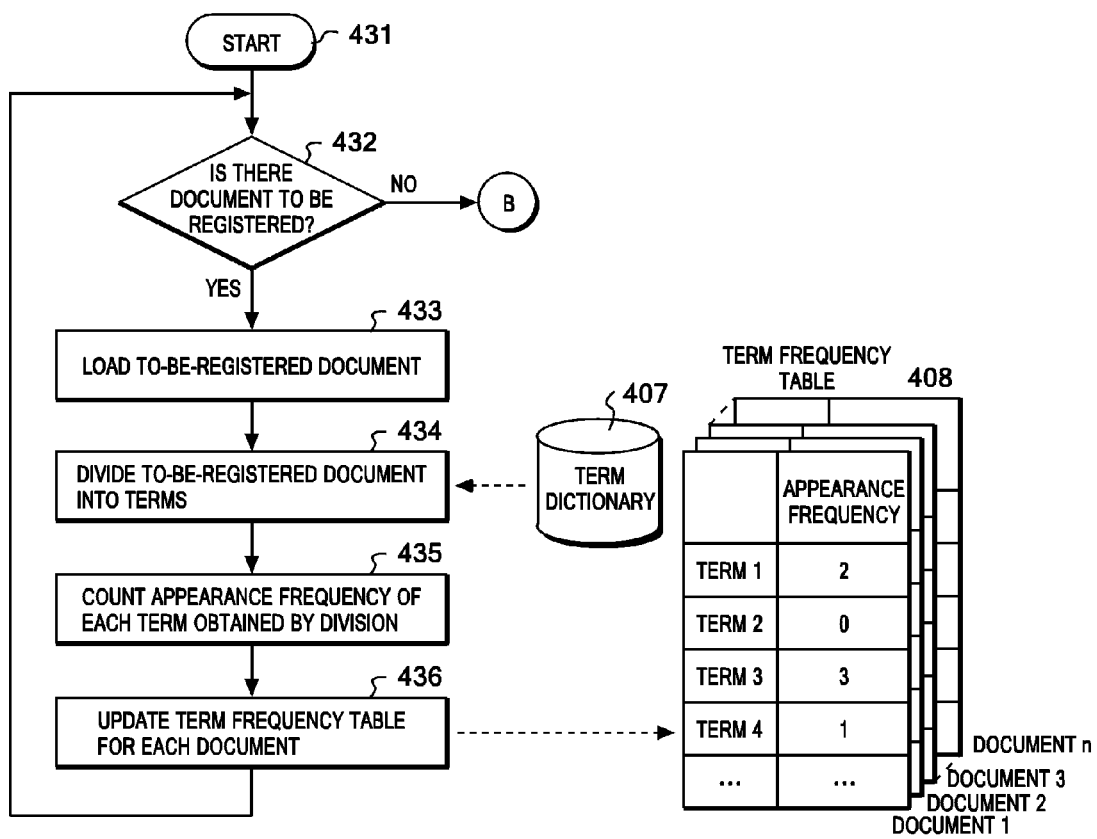
FIG. 4E shows a flow chart for updating a term frequency table for each document needed to generate the document term table shown in FIG. 4D, according to an embodiment of the present invention.
Figure 4F:
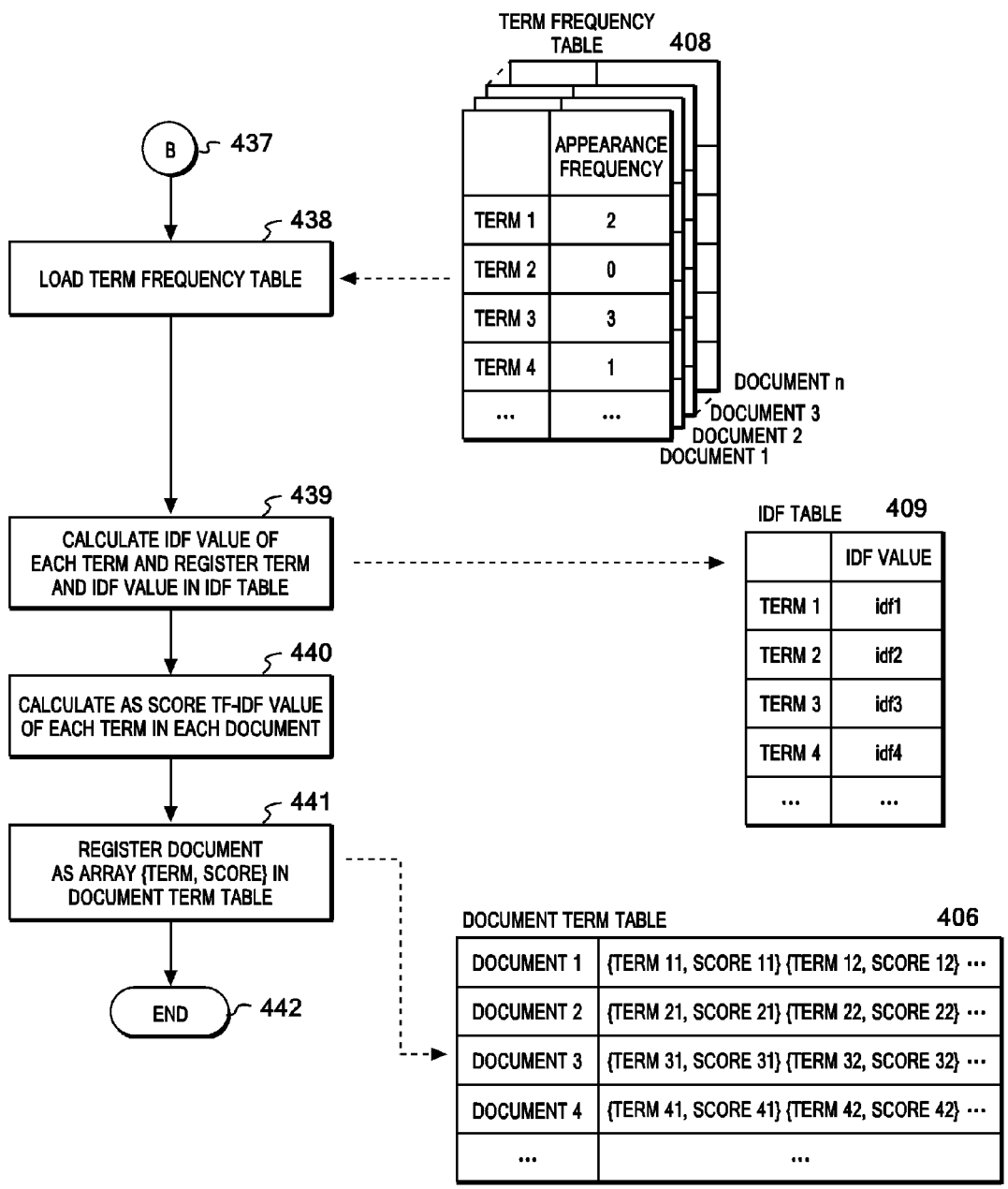
FIG. 4F shows a flow chart for generating a document term table from the term frequency table according to an embodiment of the present invention.

As embodiments of the present invention, FIGS. 4E and 4F show flow charts for generating the document term table shown in FIG. 4D.

FIG. 4E shows a flow chart for updating a term frequency table for each document needed to generate the document term table shown in FIG. 4D, according to an embodiment of the present invention. In step 431, the agent unit (120) starts generating the document term table. In step 432, the agent unit (120) checks whether there is one or more documents to be registered in the term frequency table. The document is a part or whole of a document included in the input data and being in process of creation by a user, for example. Instead, the document is a document, for example, prepared in the first place to construct the document creation assistance system. These documents are, for example, an example sentence, a template document, a document created in the past by the user, and any document other than these. When the documents to be registered exist, the agent unit (120) takes out one of the documents to be registered. After the one document is taken out, the processing moves to step 433. When there is no document to be registered, the processing moves to step 437. In step 433, the agent unit (120) loads the taken-out document to be registered, for example, to a memory. After the loading, the processing moves to step 434. In step 434, the agent unit (120) divides the loaded document into terms. For this division, morpheme analysis may be used, for example. The agent unit (120) morphemically analyzes the loaded document, and divides the loaded document into terms by comparing a result of the morphological analysis with terms registered in a term dictionary (407), for example. After the division, the processing moves to step 435. In step 435, the agent unit (120) counts the appearance frequency of each of the terms obtained by the division. Upon completion of the counting, the processing moves to step 436. In step 436, the agent unit (120) updates a term frequency table (408). The term frequency table (408) is a table in which a set of each term and the counted appearance frequency, and a set of each attribute name and the counted appearance frequency are stored for each document. After the storing, the processing returns step 432.

FIG. 4F shows a flow chart for generating a document term table from the term frequency table according to an embodiment of the present invention. Step 437 indicates a linker connecting the flow charts shown in FIGS. 4E and 4F with each other. In step 438, the agent unit (120) loads the entire term frequency table (408) updated in step 436. Upon completion of the loading, the processing moves to step 439. In step 439, the agent unit (120) calculates the IDF value for each term by using the appearance frequency of the term included in the loaded term frequency table (408). The agent unit (120) registers a set of each term and the IDF value thus calculated in an IDF table (409). Upon completion of the registration, the processing moves to step 440. In step 440, the agent unit (120) calculates the TF value for each term by using the appearance frequency of the term included in the loaded term frequency table (408). The agent unit (120) calculates the TF-IDF value for each term for each document by using the TF value and the IDF value thus calculated. Upon completion of the calculation, the processing moves to step 441. In step 441, the agent unit (120) registers the documents, terms and scores in the document term table (406). Here, the score is the TF-IDF value thus calculated. In addition, a set of a term and score is expressed, for example, as an array. In step 442, the agent unit (120) terminates the generation of the domain term table (406).

With reference to FIGS. 5A to 5E, description will be provided for an agent operation in the case where the agent #1 shown in FIG. 1A is a similar and domain document proposal agent, as an embodiment of the present invention.

Figure 5A:
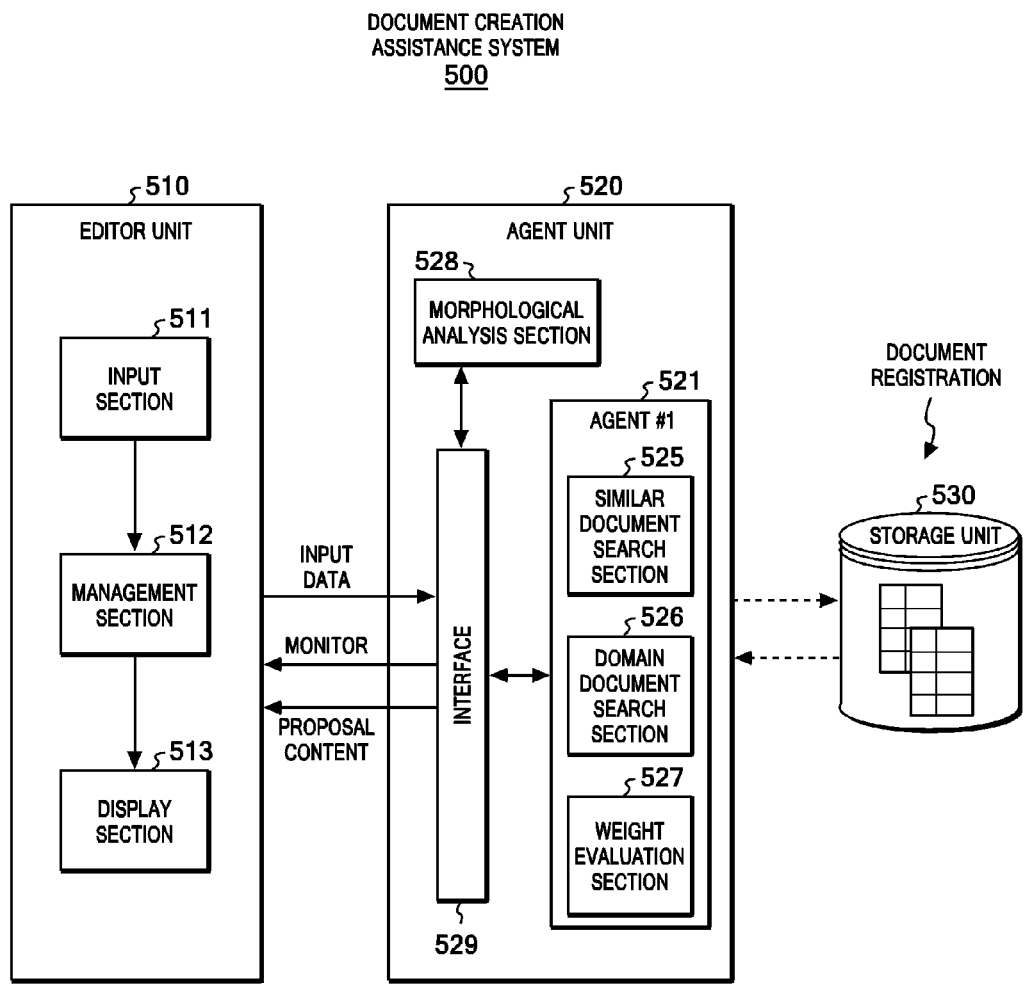
FIG. 5A shows, as an embodiment of the present invention, a block configuration diagram of a document creation assistance system in the case where the agent #1 shown in FIG. 1A is an agent to propose a similar document and a domain document (hereinafter, called a similar and domain document proposal agent).

FIG. 5A shows, as an embodiment of the present invention, a block configuration diagram of a document creation assistance system (500) in the case where the agent #1 shown in FIG. 1A is a similar and domain document proposal agent. The document creation assistance system (500) includes an editor unit (510), an agent unit (520) and a storage unit (530).

The editor unit (510) includes an input section (511), a management section (512) and a display section (513).

In the agent unit (520), a similar document and domain document proposal agent (hereinafter, called an agent #1) (521) is implemented. The agent #1 (521) includes a similar document search section (525), a domain document search section (526) and a weight evaluation section (527). The agent #1 (521) makes a transition of main search from the domain document search to the similar document search according to an amount of terms inputted by the user.

The storage unit (530) stores various types of contents as well as the document term table (406 in FIG. 4D) and the domain term table (402 in FIG. 4A) used for content search.

The similar document search section (525) calculates the similarity of a document in process of editing included in input data or a local document (hereinafter, a phrase of "a document in process of editing" is also used to indicate a local document) to each of documents accumulated in the storage unit (530) in the content search. The similar document search section (525) determines, as a proposal candidate document, a document whose calculated similarity is the highest among those of the accumulated documents, for example. In a method of calculating the similarity, the similar document search section (525) calculates the inner product of the document in process of editing and each of the accumulated documents in a vector space. Then, the similar document search section (525) retrieves, as the document with highest similarity, the document having the smallest inner product. In the similar document search by the similar document search section (525), a similar document can be retrieved with higher accuracy as the information amount included in the document in process of editing increases.

In the content search, the domain document search section (526) calculates the similarity of a domain held by the document in process of editing to each of the domains accumulated in a database (530). For example, the domain document search section (526) searches the storage unit (530) to retrieve a document belonging to the domain whose calculated similarity is the highest, and determines as the proposal candidate document the document thus retrieved. The domain document search by the domain document search section (526) is effective when the information amount included in the document in process of editing is small.

The weight evaluation section (527) allows simultaneous operations of both the similar document search section (525) and the domain document search section (526). The weight evaluation section (527) is used when the search result by the similar document search section (525) and the search result by the domain document search section (526) are used integrally. The search by the similar document search section (525) is effective when the information amount is large. On the other hand, the search by the domain document search section (526) is effective when the information amount is small. The weight evaluation section (527) assigns weights to the respective search results to make it possible to take the advantages of both the searches. Instead, the weight evaluation section (527) may select one of the search results by using a weight evaluation function, for example. The weight evaluation function changes the weights in such a manner that the search by the similar document search section (525) can be weighted more as the information amount increases, for example.

Figure 5B:
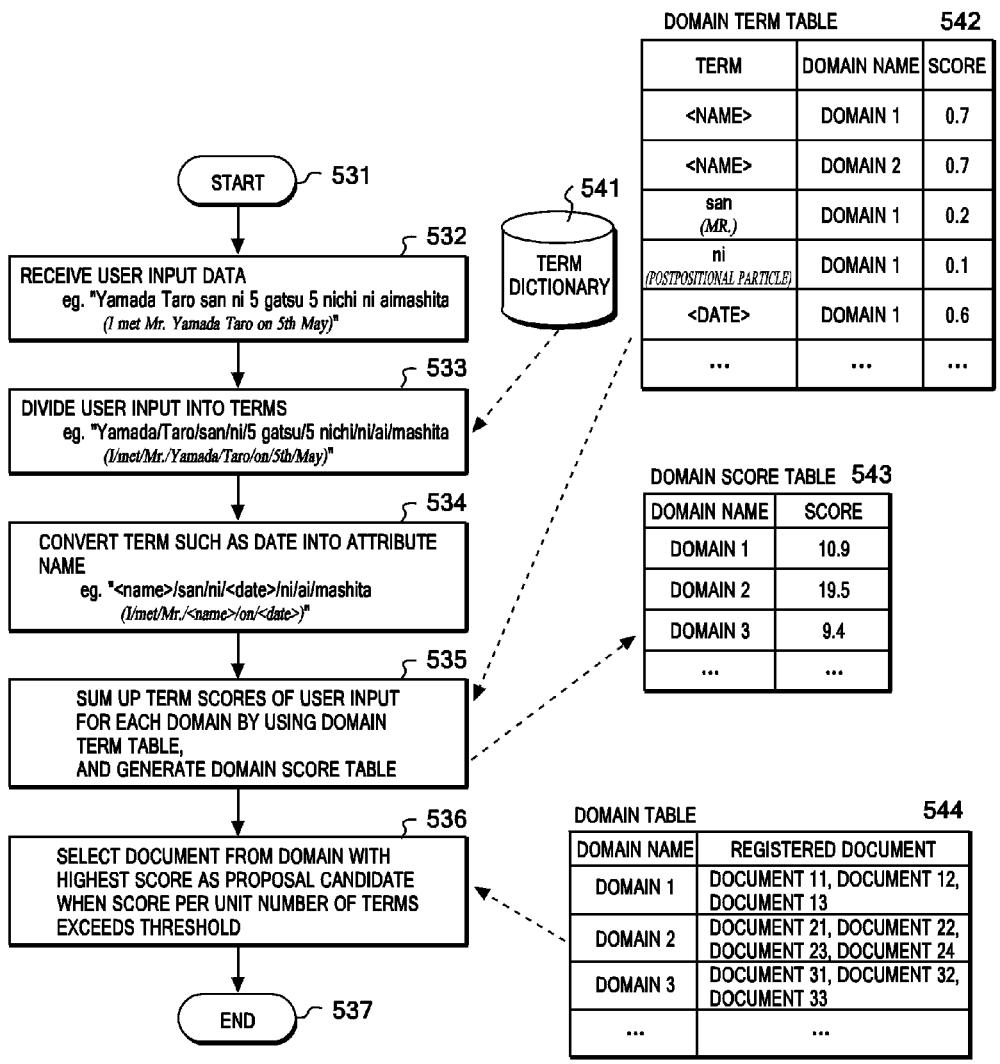
FIG. 5B shows a flow chart of the domain document search performed by the similar and domain document proposal agent in FIG. 5A according to an embodiment of the present invention.

FIG. 5B shows a flow chart of the domain document search performed by the similar and domain document proposal agent (agent #1) in FIG. 5A according to an embodiment of the present invention. The domain document search is performed by using the domain document search section (526) included in the agent #1 (521).

In step 531, the agent unit (520) starts a search operation. In step 532, the agent unit (520) receives input data from the editor unit (510). Here, the input data is assumed as "Yamada Taro san ni 5 gatsu 5 nichi ni aimashita (I met Mr. Yamada Taro on 5th May)". The agent unit (520) transmits the received input data to the morphological analysis section (528). Upon completion of the transmission, the processing moves to step 533. In step 533, the morphological analysis section (528) divides the transmitted input data into morphemes. The morphological analysis section (528) further organizes the morphemes obtained by the division by use of a term dictionary (541) to form a string of terms. As a result of the organizing, "Yamada Taro san ni 5 gatsu 5 nichi ni aimashita (I met Mr. Yamada Taro on May 5)" is processed to "Yamada/Taro/san/ni/5gatsu/5nichi/ni/ai/mashita (I/met/ Mr./Yamada/Taro/on/May/5)". Here, "/" indicates a break point in the string of terms. The morphological analysis section (528) transmits the processing result to the domain document search section (526). Upon completion of the transmission, the processing moves to step 534. In step 534, the domain document search section (526) finds a term regarded as a changeable part from among the terms included in the transmitted processing result, and converts the found term into the attribute name. As a result of conversion, the specific personal name of "Yamada Taro" included in the organized input data is converted into the abstract attribute name of <name>. In addition, the specific date of "5 gatsu 5 nichi (May 5)" included in the organized input data is converted into the abstract attribute name of <date>. In this way, the organized input data is converted from "Yamada/Taro/san/ ni/5 gatsu/5 nichi/ni/ai/mashita (I/met/Mr./Yamada/Taro/on/ 5th/May)" to "<name>/san/ni/<date>/ni/ai/mashita (I/met/ Mr1<name>/onkdate>)". Upon completion of the conversion, the processing moves to step 535. In step 535, the domain document search section (526) generates a domain score table (543) in the following procedure of a to c. Here, the domain score table (543) indicates a correspondence between the terms and attribute names (hereinafter, simply called terms including the attribute names) included in the user input after the conversion, and a total score.

a. The domain document search section (526) acquires a domain name and a score corresponding to each of terms included in the user input, from the domain term table (542) generated in step 422 in FIG. 4C.
   b. The domain document search section (526) calculates the total score of the scores thus acquired corresponding to the terms in each of the obtained domains.
   c. The domain document search section (526) generates the domain score table (543) having, as a record, a set of the obtained domain and the calculated score. Upon completion of the generation, the processing moves to step 536.

In step 536, the domain document search section (526) selects a high score domain from among the domains in the domain score table (543). Here, in the domain score table (543), three domains with the first to third highest score values, for example, are selected as the high score domains. The domain document search section (526) may regard, as a high score, a score value per unit number of terms expressed in the normalized total score when the score value exceeds a predetermined threshold. The predetermined threshold may be set at an appropriate value by the user. The domain document search section (526) acquires registered documents belonging to the selected high score domains from the domain table (544). Then, the domain document search section (526) determines the acquired registered documents as proposal candidate contents. The agent unit (520) sets a mark indicating the proposal candidate on the domain score table (543), for example. After the mark is set, the processing moves to step 537 and is terminated.

Figure 5C:
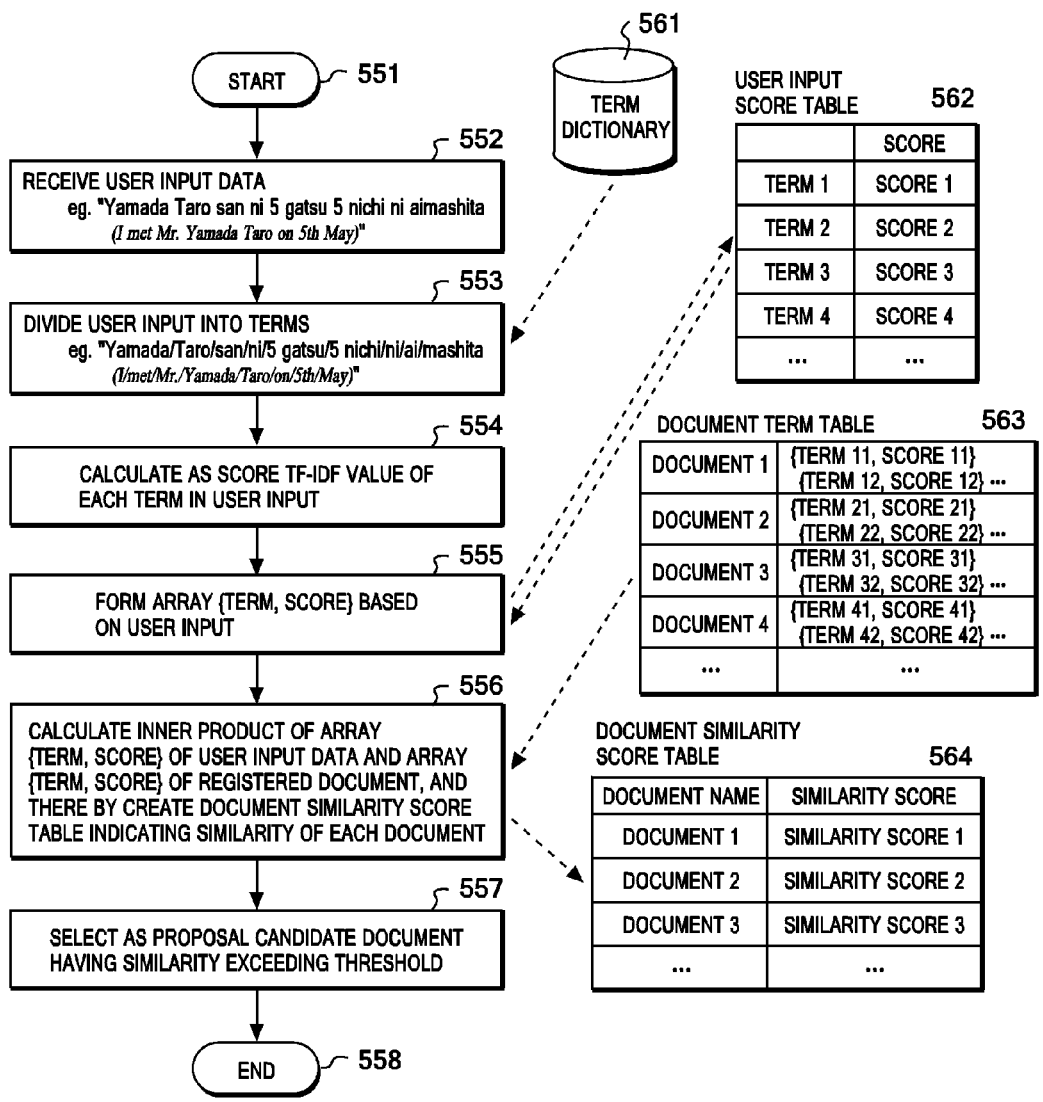
FIG. 5C shows an operational flow chart of the similar document search section included in the similar and domain document proposal agent in FIG. 5A according to an embodiment of the present invention.

FIG. 5C shows a flow chart of the similar document search performed by the similar and domain document proposal agent (agent #1) in FIG. 5A according to an embodiment of the present invention. The similar document search is performed by using the similar document search section (525) included in the agent #1 (521).

In step 551, the agent unit (520) starts a search operation. In step 552, the agent unit (520) receives input data from the editor unit (510). Here, the input data is assumed as "Yamada Taro san ni 5 gatsu 5 nichi ni aimashita (I met Mr. Yamada Taro on May 5)". The agent unit (520) transmits the received input data to the morphological analysis section (528). Upon completion of the transmission, the processing moves to step 553. In step 553, the morphological analysis section (528) divides the transmitted input data into morphemes. The morphological analysis section (528) further organizes the morphemes obtained by the division by use of a term dictionary (561) to form a string of terms. As a result of the organizing, "Yamada Taro san ni 5 gatsu 5 nichi ni aimashita (I met Mr. Yamada Taro on May 5)" is processed to "Yamada/Taro/san/ni/5 gatsu/5 nichi/ni/ai/mashita (I/met/Mr./Yamada/Taro/on/May/5)". The morphological analysis section (528) transmits the processing result to the domain document search section (526). Upon completion of the transmission, the processing moves to step 554. In step 554, the similar document search section (525) calculates a score of each term included in the processing result. The score of a term is an indicator indicating the importance of the term in a certain document. Various types of scores can be defined as the score. As the score of a term, the foregoing TF-IDF value, for example, can be used. Upon completion of the calculation, the processing moves to step 555. In step 555, the similar document search section (525) generates a user-input score table (562) having, as a record, the term and the calculated score. A set of a term and its score is below expressed as an array {term, score}. Upon completion of the generation of the table, the processing moves to step 556. In step 556, the similar document search section (525) calculates the inner product of the array in the generated user-input score table (562), and each of the documents included in the document term table (563) generated in 441 in FIG. 4F. Through the calculation, the distance in a document vector space is measured. From the calculation result (called a similarity score), the similar document search section (525) generates a document similarity score table (564) indicating the similarity of input data to each of the documents stored in the database. Upon completion of the generation, the processing moves to step 557. In step 557, the similar document search section (525) determines, as a proposal candidate content, a document with similarity exceeding a certain threshold in the generated document similarity score table (564). Here, the similar document search section (525) may select the document with the highest similarity as the proposal candidate content. The agent unit (520) sets a mark indicating the proposal candidate on the document similarity score table (564), for example. After the mark is set, the processing moves to step 558 and is terminated.

Figure 5D:
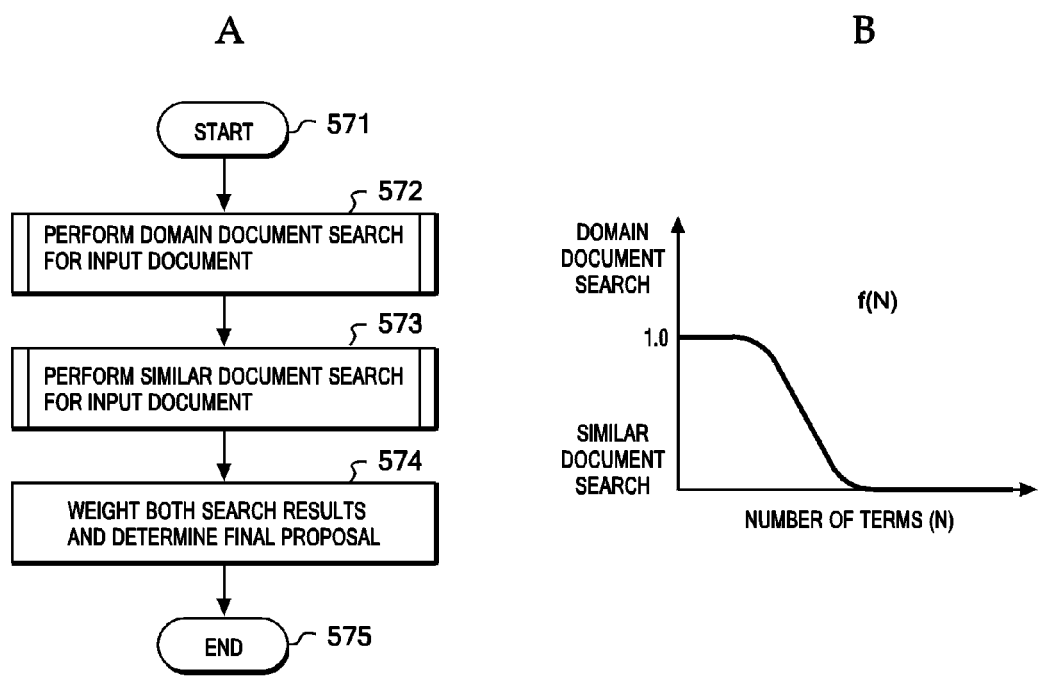
FIG. 5D shows an operational flow chart of the weight evaluation section included in the similar and domain document proposal agent shown in FIG. 5A and an example of a weighting function according to an embodiment of the present invention.

FIG. 5D shows an operational flow chart of the weight evaluation section (527) included in the similar and domain document proposal agent (agent #1) shown in FIG. 5A and an example of a weighting function according to an embodiment of the present invention. The weight evaluation section (527) has a function to determine a proposal from proposal candidates obtained by the domain document search section (526) and proposal candidates obtained by the similar document search section (525).

In step 571, the weight evaluation section (527) starts a weight evaluation operation. Step 572 is equivalent to all the processing in the flow chart shown in FIG. 5B. In step 572, the agent unit (520) operates the domain document search section (526) to obtain a proposal candidate contents as the calculation result. The proposal candidate content is a document belonging to the domain marked on the domain score table (543), for example. Step 573 is equivalent to all the processing in the flow chart shown in FIG. 5C. In step 573, the agent unit (520) operates the similar document search section (525) to obtain a proposal candidate content as the calculation result. The proposal candidate content is a document marked on the document similarity score table (564), for example. In step 574, the weight evaluation section (527) evaluates the search result of the domain document search shown in step 572, and the search result of the similar document search shown in step 573 by using a weighting function f(N) on the score marked on the domain score table (543) and the score marked on the document similarity score table (564) that are the scores of both the search results. Here, N denotes the number of terms included in user input. The weighting function f(N) is a function expressed as a graph shown in a part B of FIG. 5D. The horizontal axis of the graph represents the number of terms. The vertical axis of the graph represents a rate at which proposal candidates (called first candidates below) from the domain document search are adopted as proposals to the user. The value of the weighting function f(N) changes in such a manner that, as the number of inputted terms N increases, more importance is placed on proposal candidates (called second candidates below) obtained from the similar document search than on the proposal candidates (first candidates) obtained from the domain document search. In short, the value of the weighting function f(N) gradually decreases from 1 to 0. Here, let's consider a case where n contents, for example, will be presented to a user, as an example of the evaluation using the weighting function f(N). In this case, for example, f(N)*n contents are adopted from the first candidates and (1−f(N))*n contents are adopted from the second candidates. For instance, when the value of f(N) is 0.6 and when the agent proposes 5 contents to the user, the number of contents adopted from the first candidates (referred to as n1 below) is n1=0.6×5=3 (contents). Then, the number of contents adopted from the second candidates (referred to as n2 below) is n2=(1−0.6)×5=2 (contents). In this regard, when only one content is proposed to the user, n1 and n2 are calculated where n is set at n=1. Then, one content may be adopted from the first candidates when n1>n2, whereas one content may be adopted from the second candidates when n1<=n2. In step 575, the weight evaluation section (527) terminates the weight evaluation operation.

The agent unit (520) transmits the adopted proposal content to the editor unit (510). The editor unit (510) displays the transmitted content in a balloon form drawn from the icon, for example. When there are two or more proposal contents, the editor unit (510) may display the two or more proposal contents in turn by switching the contents at certain time intervals, for example. Instead, the editor unit (510) may display the two or more proposal contents by using an icon which allows different contents to be displayed one by one in response to an operation like turning a page.

Figure 5E:
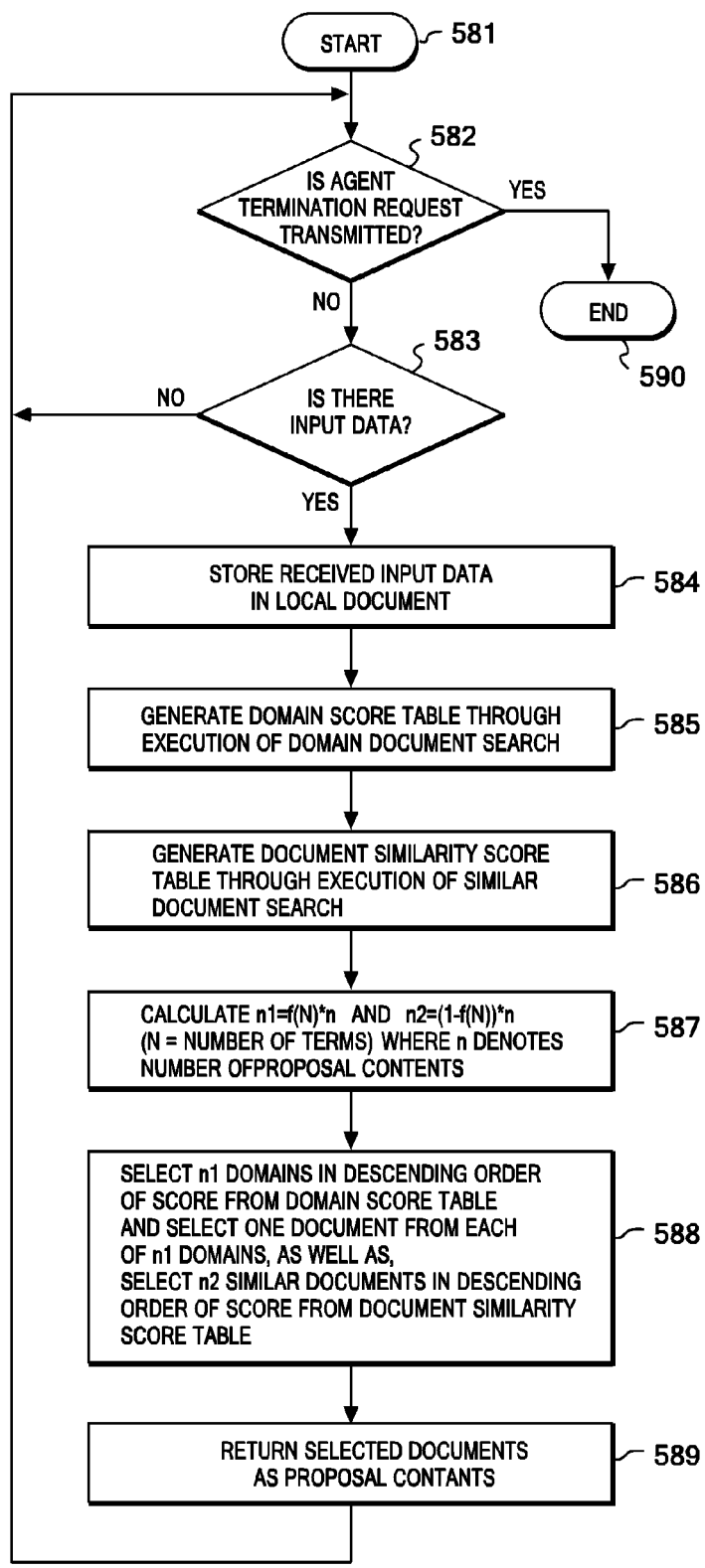
FIG. 5E shows an operational flow chart of the similar and domain document proposal agent shown in FIG. 5A according to an embodiment of the present invention.

FIG. 5E shows an operational flow chart of the weight evaluation section (527) included in the similar and domain document proposal agent (agent #1) shown in FIG. 5A according to an embodiment of the present invention. In step 581, the agent unit (520) starts a search operation. In step 582, the agent unit (520) determines whether a termination request to terminate the agent has been transmitted from the editor unit (510). When there is no termination request, the processing moves to step 583. On the other hand, when there is a termination request, the processing moves to step 590, and then is terminated. In step 583, the agent unit (520) determines whether there is input data. The input data is transmitted from the editor unit (510). Instead, the agent unit (520) performs a polling operation as a transmission request to cause the editor unit (510) to transmit the input data. When the input data is transmitted from the editor unit (510), the agent unit (520) receives the input data and the processing moves to step 584. When no input data is transmitted from the editor unit (510), the processing returns to step 582. In step 584, the agent unit (520) stores the received input data in the local document. Upon completion of the storing, the processing moves to step 585. In step 585, the agent unit (520) executes the aforementioned domain document search, and generates the domain score table (543 in FIG. 5B). Upon completion of the generation, the processing moves to step 586. In step 586, the agent unit (520) executes the aforementioned similar document search, and generates the document similarity score table (564 in FIG. 5C). Upon completion of the generation, the processing moves to step 587. In step 587, the agent unit (520) figures out the number of proposal contents (n1) to be adopted from the result of the domain document search and the number of proposal contents (n2) to be adopted from the result of the similar document search. To this end, the agent unit (520) first determines the number of contents (n) to be proposed. The number of contents (n) may be the number of records whose scores in, for example, the domain score table (543) or the document similarity score table (564) exceed a predetermined threshold, or may be a number determined in another way. Next, the agent unit (520) obtains n1 and n2 from the determined n. Expressions to calculate n1 and n2 are, for example, an expression n1=f(N)*n and an expression n2=(1−f(N))*n. Here, the function f(N) is the weighting function explained in FIG. 5D. After n1 and n2 are obtained, the processing moves to step 588. In step 588, the agent unit (520) selects n1 domains from the domain score table (543) in descending order of the score. The agent unit (520) searches the domain table (544) by using the selected domains as search keys and selects one document (hereinafter, called a first document) for each of the selected domains from the domain table (544). The agent unit (520) may select a document for each domain in a certain fixed order, or may select the document according to any logic. The agent unit (520) selects n2 similar documents (hereinafter, called second documents) in descending order of the score of the document similarity score table (564). Upon completion of the selection, the processing moves to step 589. In step 589, the agent unit (520) sequentially transmits the selected first and second documents as proposed contents to the editor unit (510). Upon completion of the transmission, the processing returns to step 582.

Figure 6A:
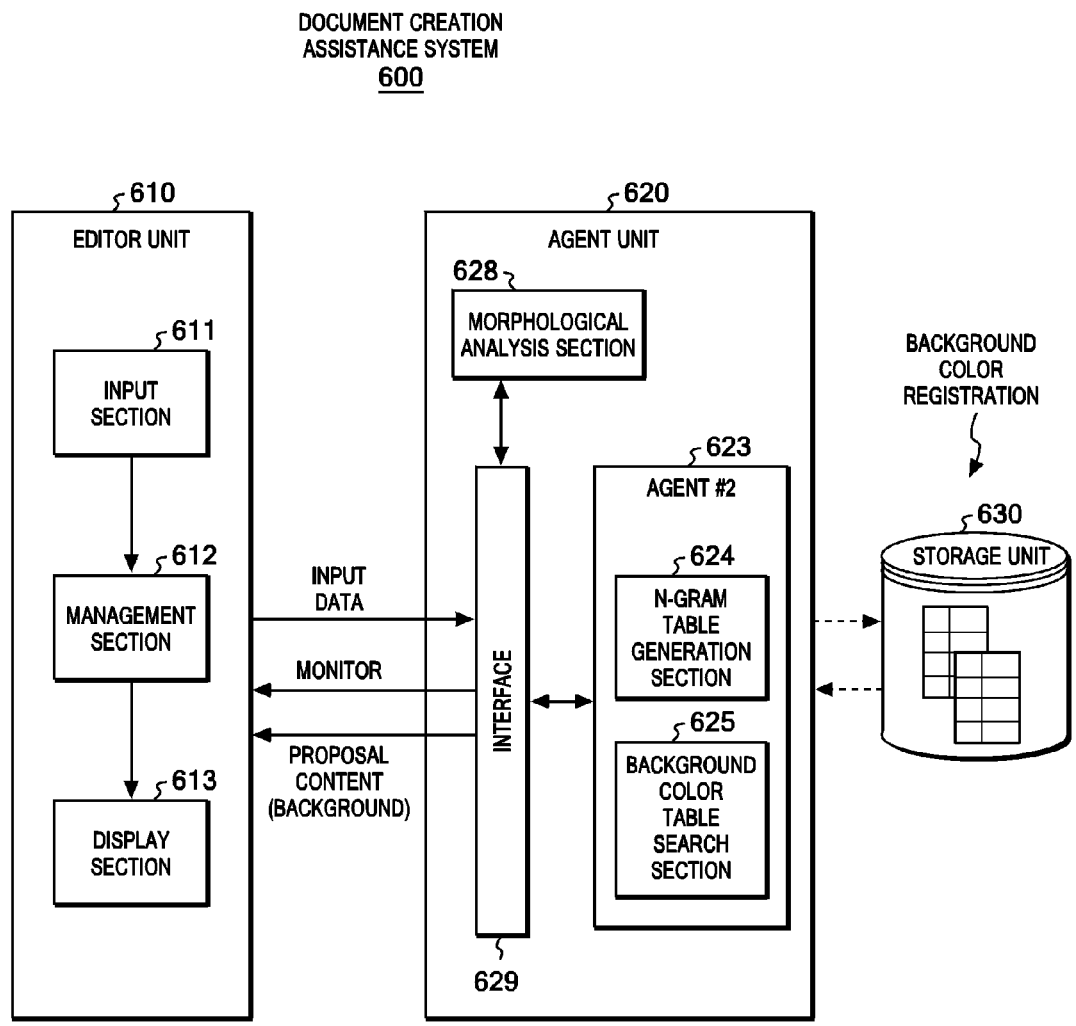
FIG. 6A shows, as an embodiment of the present invention, a block configuration diagram of a document creation assistance system in the case where the agent #2 shown in FIG. 1A is an agent to propose a background (hereinafter, called a background proposal agent).
Figure 6B:
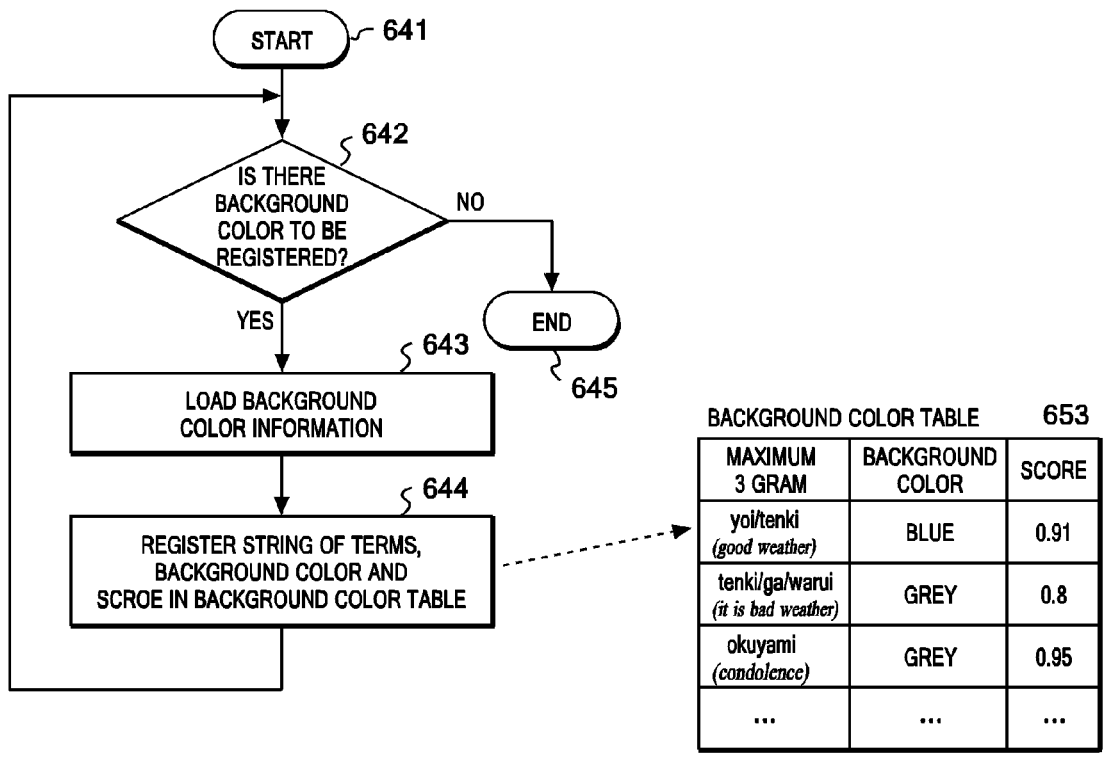
FIG. 6B shows a flow chart for performing registration to a background color table used in the background proposal agent in FIG. 6A according to an embodiment of the present invention.
Figure 6C:
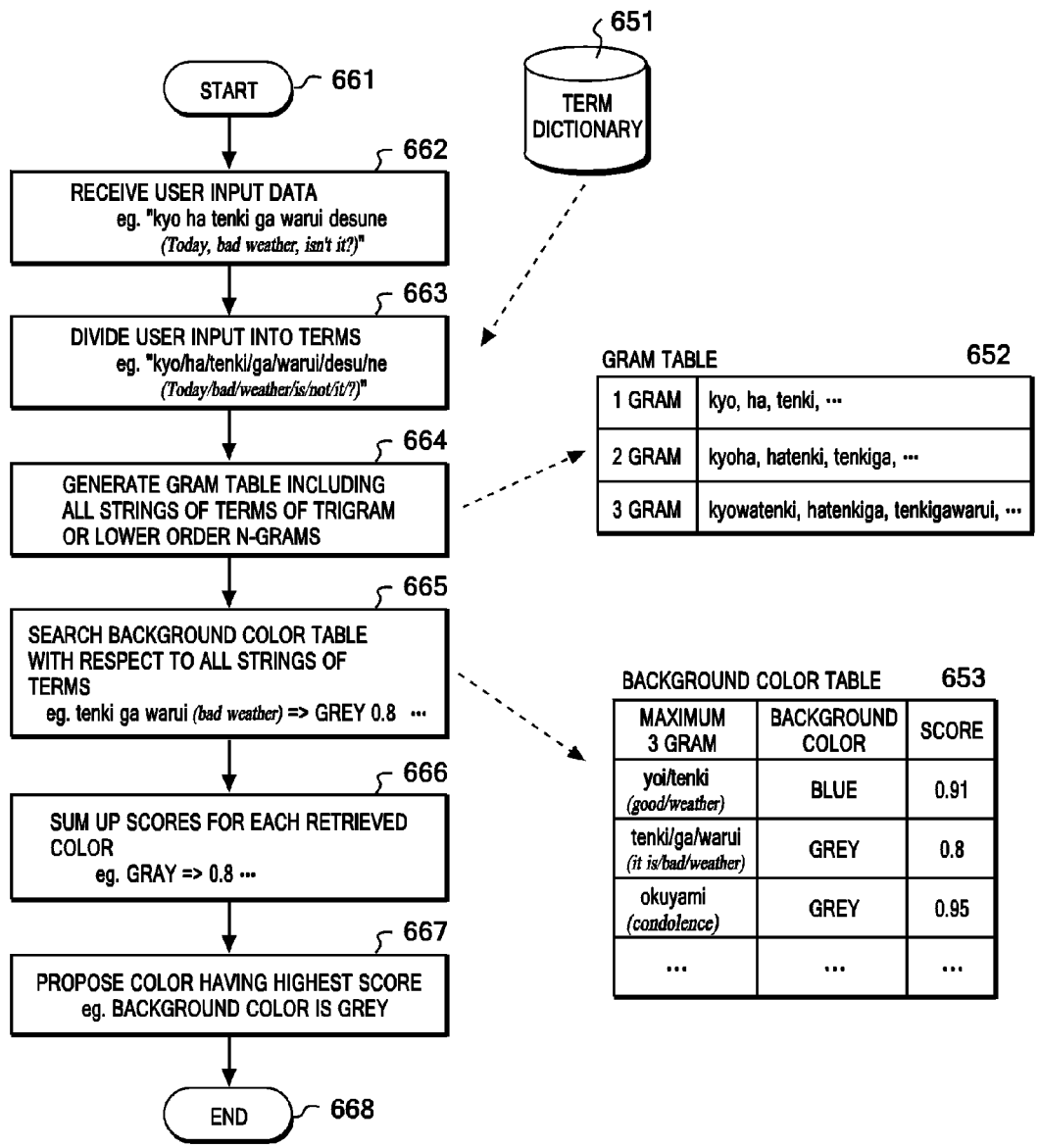
FIG. 6C shows an operational flow chart of the background proposal agent in FIG. 6A according to an embodiment of the present invention.

With reference to FIGS. 6A to 6C, description will be provided for an agent operation in the case where the agent #2 shown in FIG. 1A is a background proposal agent, as an embodiment of the present invention.

FIG. 6A shows, as an embodiment of the present invention, a block configuration diagram of a document creation assistance system (600) in the case where the agent #2 shown in FIG. 1A is a background proposal agent. The document creation assistance system (600) includes an editor unit (610), an agent unit (620) and a storage unit (630).

The editor unit (610) includes an input section (611), a management section (612) and a display section (613).

In the agent unit (620), a background proposal agent (hereinafter, called an agent #2) (623) is implemented. The agent #2 proposes a background content of a document, such as, for example, a background color, a background pattern, a background image or a background illustration.

The agent #2 (623) includes an N-gram table generation section (624) and a background color table search section (625). The N-gram table generation section (624) generates a gram table (652 in FIG. 6C) from the analysis result of user input data by the morphological analysis section (628). The gram table (652) includes an entire list of strings of terms of n-gram or lower order n-grams. The background color table search section (625) searches the background color table (653 in FIG. 6B) based on the gram table (652), and proposes a background content determined as (most) suitable to the input data. Here, the background color table (653) stores, for example, background colors, strings of terms associated with the respective background colors, and scores associated with the respective background colors. The maximum length of a string of terms is not particularly limited, but may be 3 grams, for example. The background colors may be expressed by color codes, for example.

The storage unit (630) includes various types of contents and a background color table representing each correspondence between a background and a background content.

FIG. 6B shows a flow chart for performing registration to a background color table used in the background proposal agent (agent #2) in FIG. 6A according to an embodiment of the present invention. Before the start of step 641, a background color table (653) is prepared in advance in the storage unit (630). In step 641, the agent unit (620) starts a registration operation for a background color. In step 642, the agent unit (620) determines whether there is a background color to be registered. When there is no background color to be registered, the processing moves to step 645 and the operation is terminated. When there is a background color to be registered, the processing moves to step 643. In step 643, the agent unit (620) loads background color information on the to-be-registered background color onto the storage unit (630). The background color information indicates a background color, a string of terms associated with the background color, and a score associated with the background color. In step 644, the agent unit (620) registers the background color information loaded in step 643 to the background color table (653). The background color table (653) is a table in which to register a string of terms, a background color and a score indicating how strong the string of terms and the background color are related to each other. Upon completion of the registration, the processing returns to step 642.

FIG. 6C shows an operational flow chart of the background proposal agent (agent #2) in FIG. 6A according to an embodiment of the present invention. In step 661, the agent unit (620) starts a search operation. In step 662, the agent unit (620) receives user input from the editor unit (610). The user input is, for example, "kyo ha tenki ga warui desu ne (Today, bad weather, isn't it?)". The agent unit (620) transmits the received user input to the morphological analysis section (628). Upon completion of the transmission, the processing moves to step 663. In step 663, the morphological analysis section (628) divides the received user input into morphemes. The morphological analysis section (628) further organizes the morphemes obtained by the division by use of a term dictionary (651) to form a string of terms. In the case where the user input is, for example, "kyo ha tenki ga warui desu ne (Today, bad weather, isn't it?)", the morphological analysis section (528) processes the input into "kyo/ha/tenki/ga/warui/desu/ne (Today/bad/weather/is/not/it/?)". The morphological analysis section (628) transmits the processing result to the N-gram table generation section (624). Upon completion of the transmission, the processing moves to step 664. In step 664, the N-gram table generation section (624) generates the gram table (652) from the foregoing string of terms. The gram table (652) stores, for example, each string of three or less successive terms of the foregoing string of terms, that is, all the strings of terms of trigram or lower order n-grams. In the case where the foregoing input is "kyo/ha/tenki/ga/warui/desu/ne", the gram table (652) includes 1-gram strings such as "kyo, ha, tenki, . . . ", 2-gram strings such as "kyoha, hatenki, tenkiga, . . . ", and 3-gram strings such as "kyohatenki, hatenkiga, tenkigawarui," Upon completion of the generation of the gram table (652), the processing moves to step 665. In step 665, the background color table search section (625) searches the background color table (653) registered in advance in the storage unit (630), by using each of all the strings of terms of trigram or lower order n-grams. As a result of the search, the background color and score associated with each of the strings of terms of trigram or lower order n-grams are obtained. In the example in which the user input is "kyo/ha/tenki/ga/warui/desu/ne", when the background color table (653) is searched by using a trigram string of terms of "tenkigawarui (bad weather)", "gray" and "0.8" associated with "tenki/ga/warui" on the second line in the background color table (653) are retrieved. Upon completion of the search, the processing moves to step 666. In step 666, the background color table search section (625) sums up scores for each of the obtained background colors. Upon completion of the summing up, the processing moves to step 667. In step 667, the background color table search section (625) transmits a highest score color as a proposal content to the editor unit (610). Here, the highest score color is a color having the highest summed-up score among the background colors. Upon completion of the transmission, the processing moves to step 668 and then is terminated. In the example in which the user input is "kyo/ha/tenki/ga/warui/desu/ne", the highest score color having the highest summed score is gray. Thus, as the background color, gray is proposed to the editor unit (610) that receives the transmitted content.

Figure 7A:
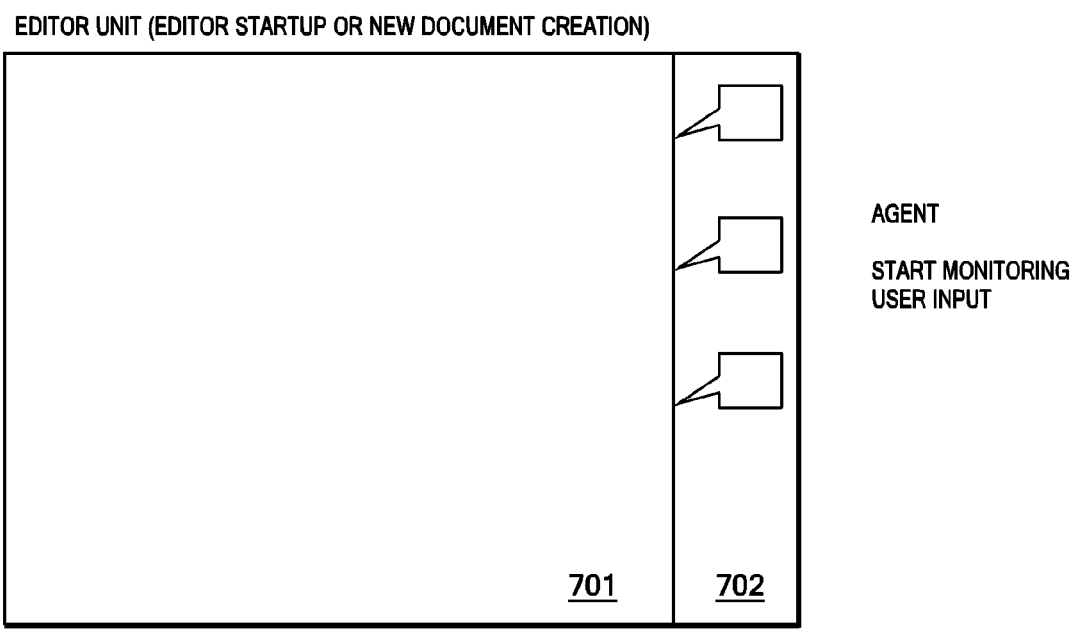
FIG. 7A shows the screen displayed immediately after the editor unit (110) is started up or an instruction to create a new document is issued according to an embodiment of the present invention.
Figure 7B:
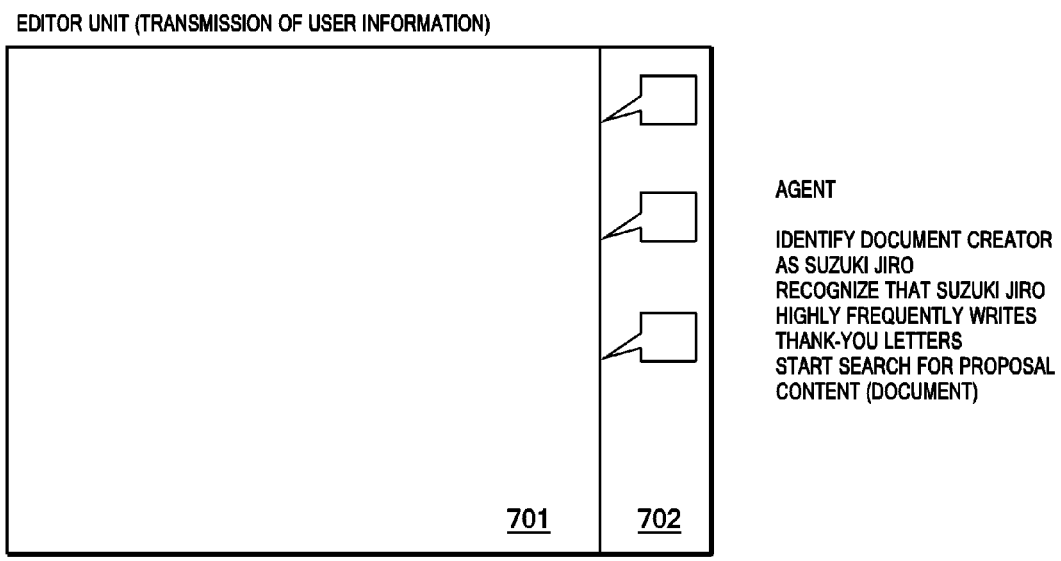
FIG. 7B shows the screen during the transmission of user information according to an embodiment of the present invention.
Figure 7C:
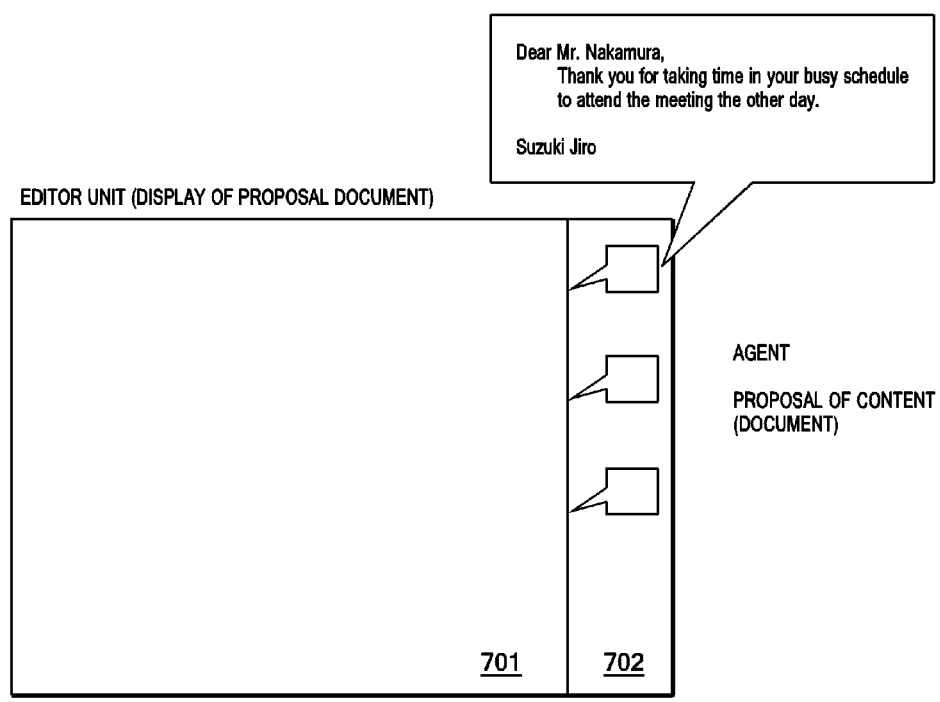
FIG. 7C shows the screen in which a template document is proposed according to an embodiment of the present invention.
Figure 7D:
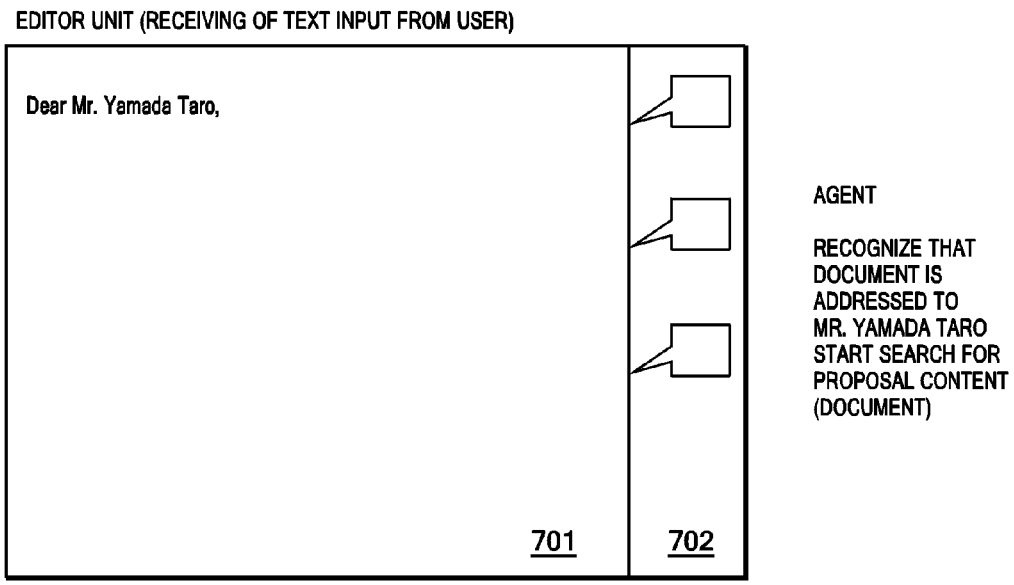
FIG. 7D shows the screen in the course of receiving the text input from the user according to an embodiment of the present invention.
Figure 7E:
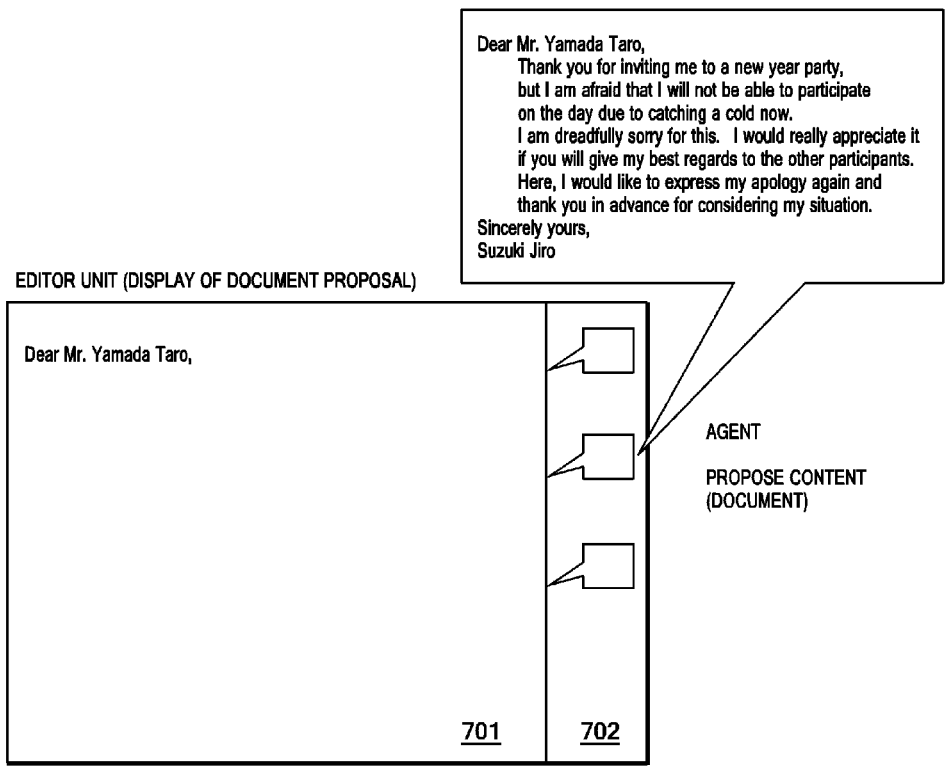
FIG. 7E shows the screen in which a similar document is proposed according to an embodiment of the present invention.
Figure 7F:
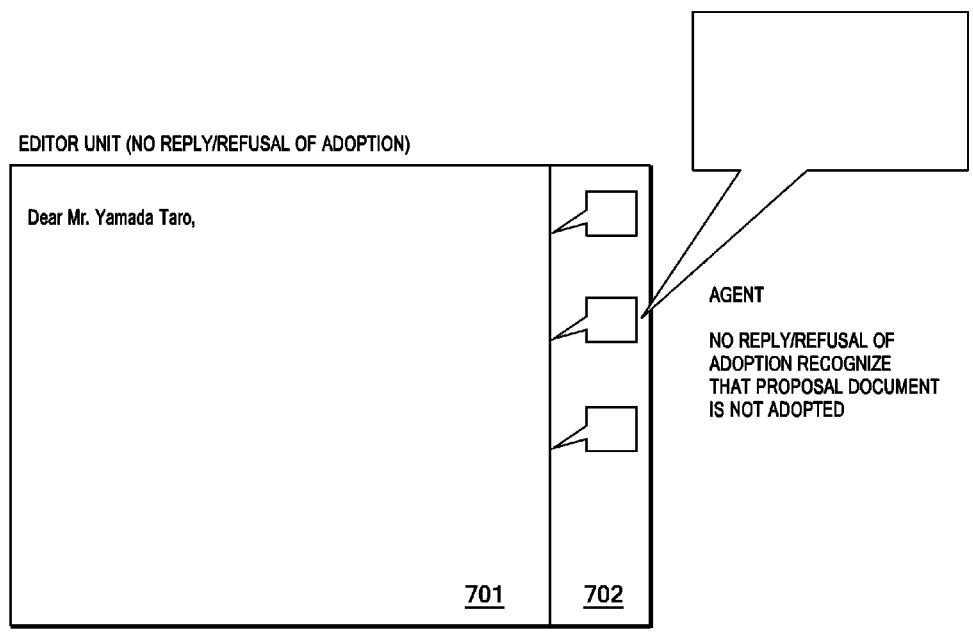
FIG. 7F shows the screen in which the display of the similar document proposed in FIG. 7E is disappearing according to an embodiment of the present invention.
Figure 7G:
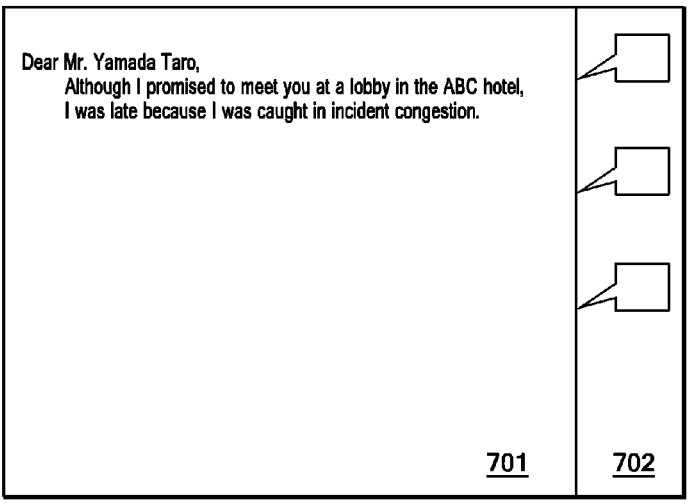
FIG. 7G shows the screen in the course of receiving additional text inputted from the user according to an embodiment of the present invention.
Figure 7I:
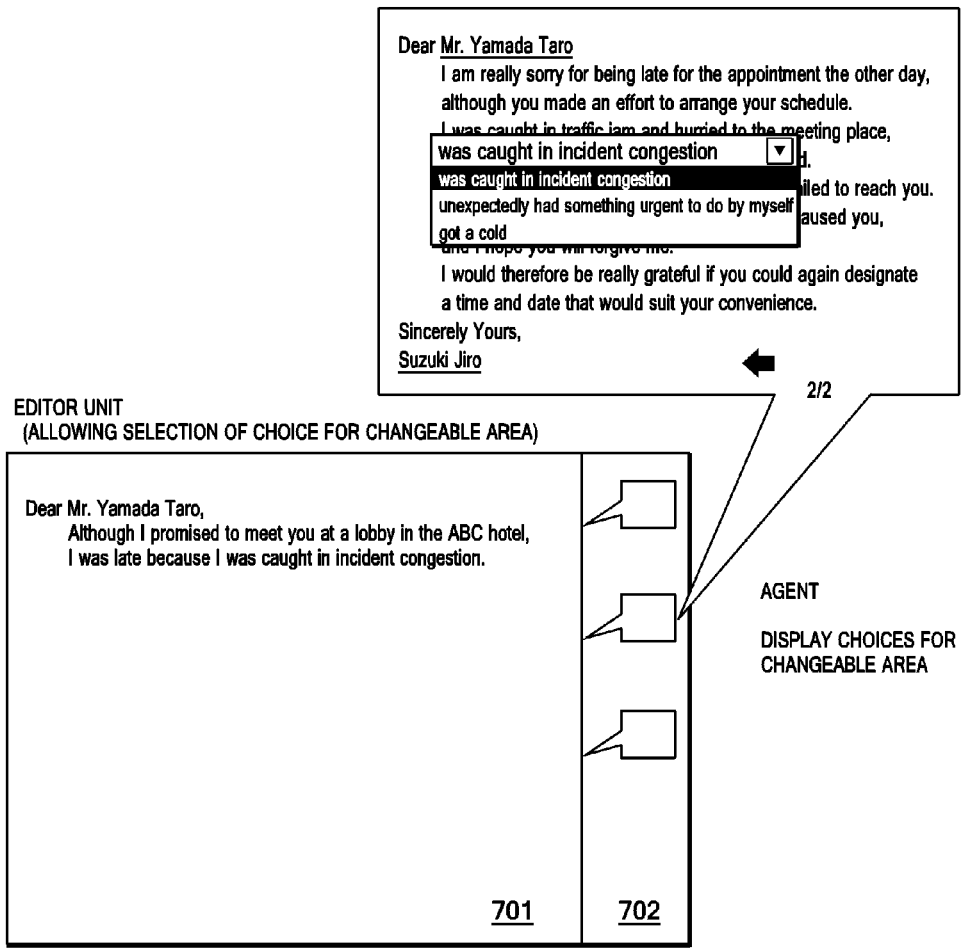
FIG. 7I shows the screen of an example in which choices are provided to a changeable area according to an embodiment of the present invention.
Figure 7J:
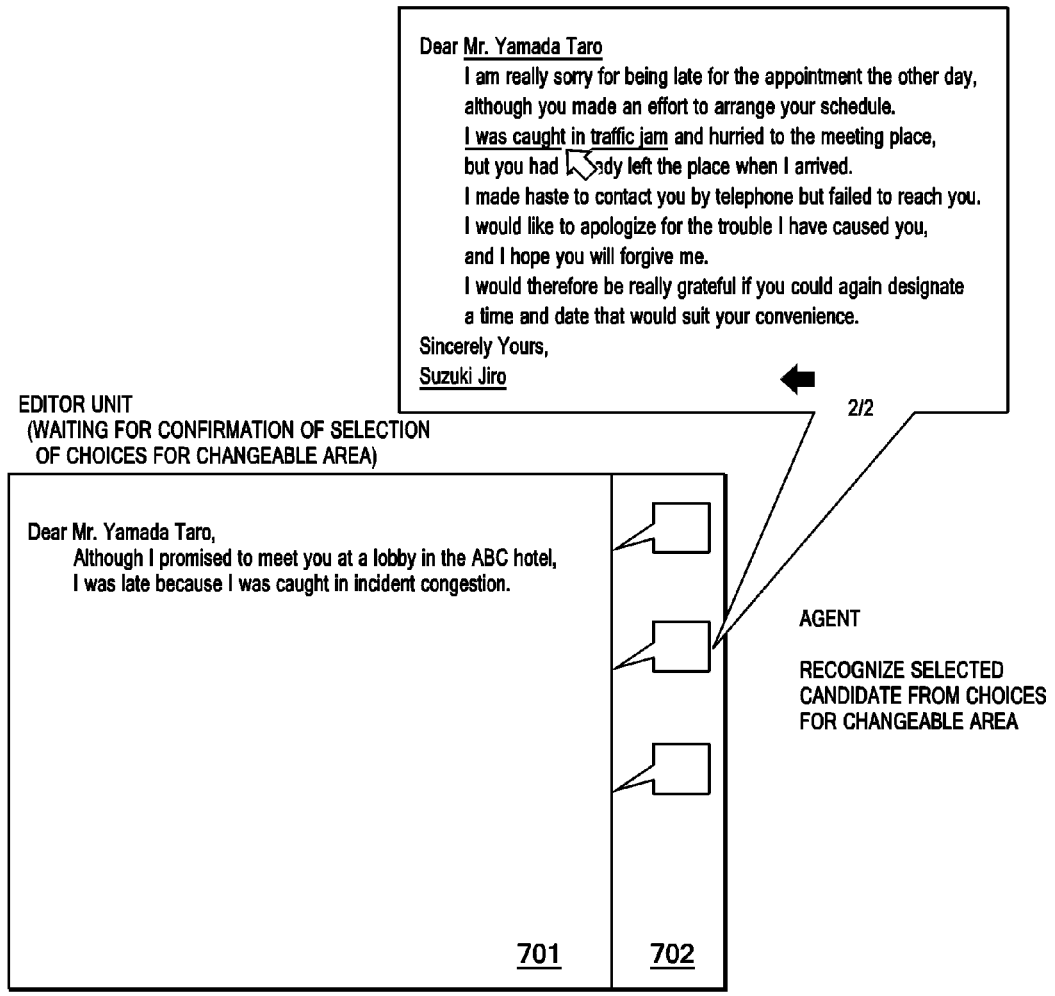
FIG. 7J shows the screen in which the selection of a candidate for the changeable area is waiting to be confirmed according to an embodiment of the present invention.
Figure 7K:
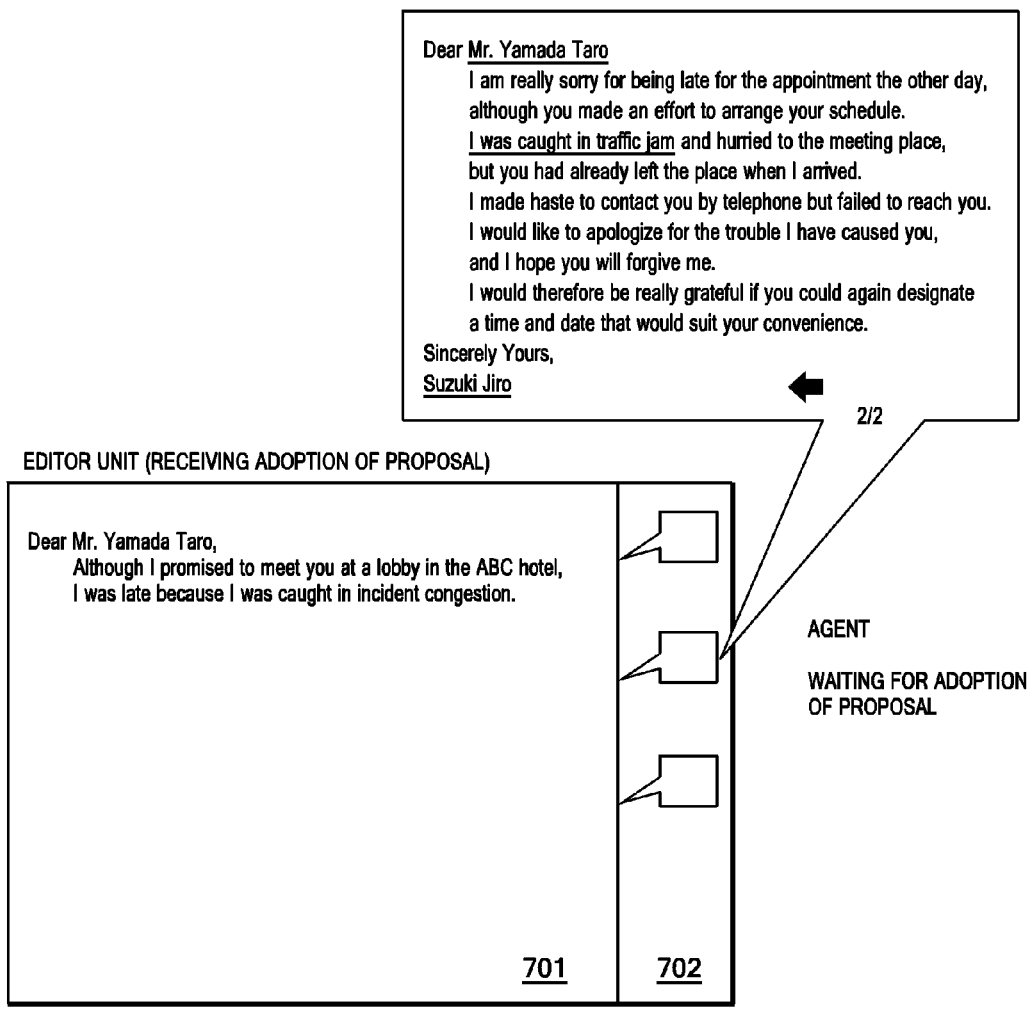
FIG. 7K shows the screen in which a proposal is waiting to be adopted according to an embodiment of the present invention.
Figure 7M:
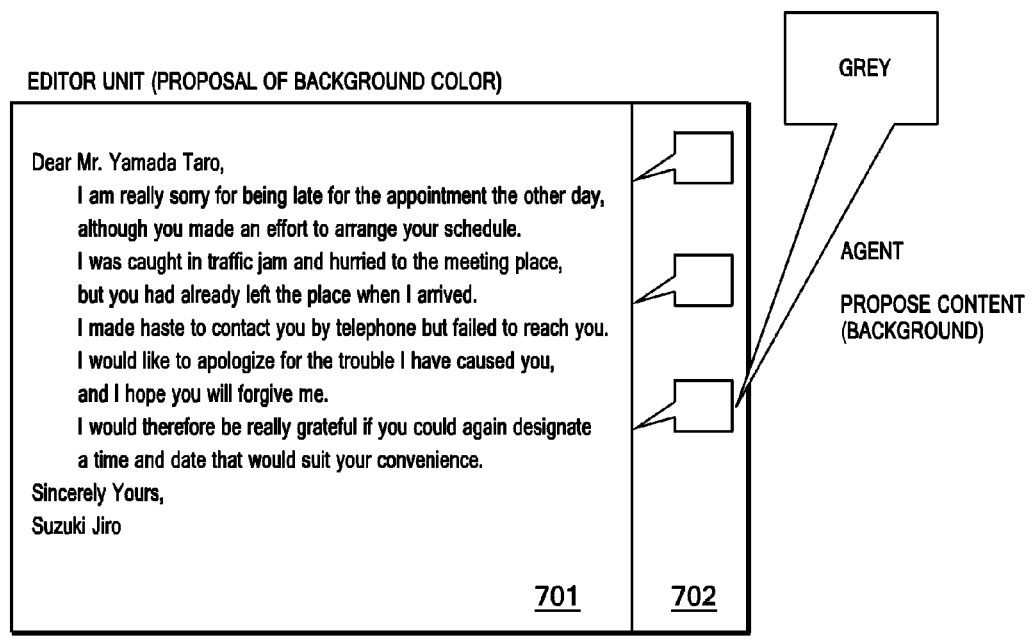
FIG. 7M shows the screen in which a proposal for background data is made according to an embodiment of the present invention.
Figure 7N:
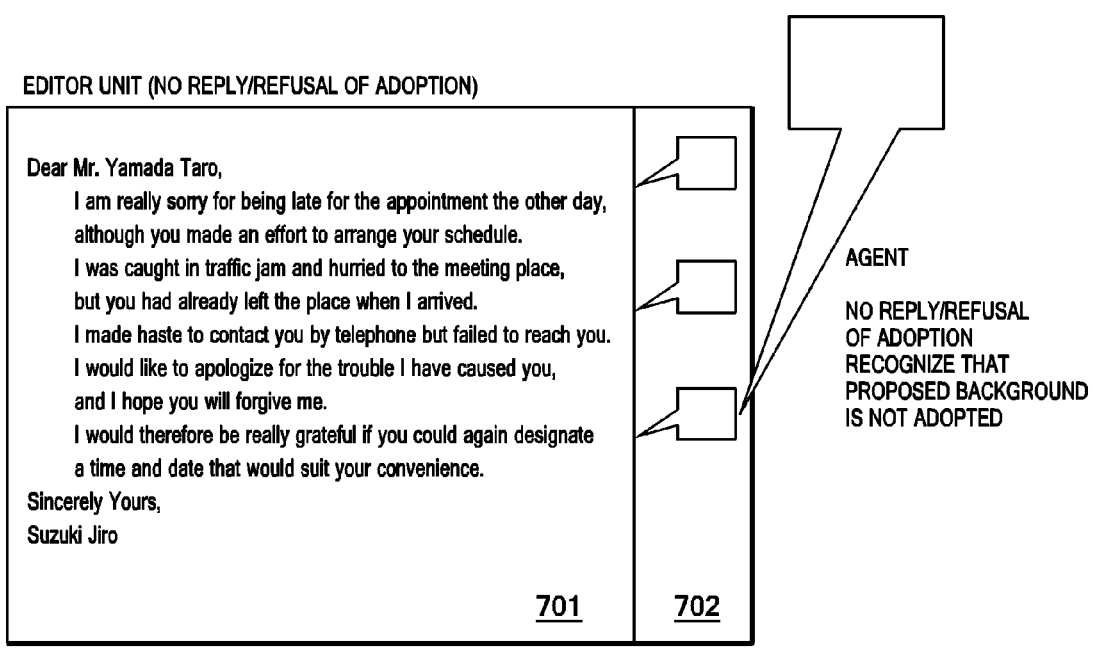
FIG. 7N shows the screen in which the proposed background color is refused according to an embodiment of the present invention.

FIGS. 7A to 7N show examples of a screen of a display section in which a content is proposed by using the document creation assistance system shown in FIG. 1A as an embodiment of the present invention. Note that the screen includes an input data display section (701) and an agent display section (702). The input data display section (701) is a screen in which a document in process of editing by the user is displayed. The agent display section (702) is a screen in which at least one agent and a proposal from the agent are displayed.

FIG. 7A shows the screen displayed immediately after the editor unit (110) is started up or an instruction to create a new document is issued according to an embodiment of the present invention. At a time immediately after the editor unit (110) is started up or an instruction to create a new document is issued, there is no user input data, that is, no text. For this reason, nothing is displayed in the input data display section (701). Meanwhile, three icons are displayed in the agent display section (702). The three icons correspond to three agents, respectively. The first icon at the uppermost position is an icon of a template document proposal agent, for example. The second icon is an icon of a similar and domain document proposal agent, for example. The third icon is an icon of a background proposal agent, for example. The editor unit (110) waits for text input from the user. Each of the agents starts monitoring input from the user.

FIG. 7B shows the screen during the transmission of user information according to an embodiment of the present invention. After the state shown in FIG. 7A, the editor unit (110) identifies the user as Suzuki Jiro in reference to the login information of OS, for example, in response to the start-up of the editor unit (110) or a new document creation. FIG. 7B shows the screen during the transmission. While the user information indicating Suzuki Jiro is being transmitted to the agents, the screen shows no change. The transmission is performed in the background irrespective of a time point when the user inputs text. The editor unit (110) waits for text input from the user. The template document proposal agent identifies the document creator as Suzuki Jiro on the basis of the transmitted user information. In reference to the history of past document creation by Suzuki Jiro, the template document proposal agent recognizes that Suzuki Jiro highly frequently writes thank-you letters. The template document proposal agent starts searching a database for a template document of thank-you letter. The template document is, for example, a template document of thank-you letter or a thank-you letter created in the past by Suzuki Jiro. Each of the agents is continuously monitoring the input from the user.

FIG. 7C shows the screen in which a template document is proposed according to an embodiment of the present invention. After the state shown in FIG. 7B, the template document proposal agent transmits the retrieved template document of thank-you letter as a proposal content to the editor unit (110). FIG. 7C shows the screen immediately after the completion of the transmission. In the screen, the template document of thank-you letter retrieved by the template document proposal agent is displayed in a balloon form even though the user has inputted no text so far. The editor unit (110) is still waiting for the text input from the user. The template document proposal agent passes the retrieved template document to the editor unit (110), and waits for an instruction indicating the adoption or refusal of the template document from the user. Each of the agents is continuously monitoring the input from the user.

FIG. 7D shows the screen in the course of receiving the text input from the user according to an embodiment of the present invention. After the state shown in FIG. 7C, the user refuses the proposed template document of thank-you letter. In addition, the user inputs "Dear Mr. Yamada Taro," to the editor unit (110). FIG. 7D shows the screen immediately after the input. In the screen, the text input "Dear Mr. Yamada Taro," is displayed. Since the template document previously displayed is refused, the display of the template document already disappears from the screen. The editor unit (110) is still waiting for text input from the user. The similar and domain document proposal agent recognizes that the document in process of creation is addressed to Mr. Yamada Taro, on the basis of the input "Dear Mr. Yamada Taro,". Then, the similar and domain document proposal agent starts searching the database for a document created in the past and addressed to Mr. Yamada Taro. The similar and domain document proposal agent passes the retrieved document to the editor unit (110). Each of the agents is continuously monitoring the input from the user.

FIG. 7E shows the screen in which a similar document is proposed according to an embodiment of the present invention. After the state shown in FIG. 7D, the editor unit (110) displays the similar document, which is received from the similar and domain document proposal agent, in the agent display section (702). FIG. 7E shows the screen immediately after the similar document is completely displayed. In the screen, the similar document retrieved by the similar and domain document proposal agent is displayed in a balloon form. The editor unit (110) is continuously waiting for text input from the user. The similar and domain document proposal agent is waiting for an instruction indicating the adoption or refusal of the proposed similar document by the user. Each of the agents is continuously monitoring the input from the user.

FIG. 7F shows the screen in which the display of the similar document proposed in FIG. 7E is disappearing according to an embodiment of the present invention. After the state shown in FIG. 7E, the user refuses the proposed similar document or does not reply to the proposal for a predetermined time period. FIG. 7F shows the screen at a time when the user refuses the proposed similar document or does not reply to the proposal for a predetermined time period. In the screen, the proposed similar document is disappearing in response to the refusal of the proposal from the user or in response to no reply from the user. The editor unit (110) is continuously waiting for text input from the user. The similar and domain document proposal agent determines that the proposal is refused in accordance with the instruction from the user indicating the refusal of the similar document or in response to the fact that the predetermined time period has passed after the similar document is proposed. The similar and domain document proposal agent causes the display of the proposal of the similar document to disappear from the screen, in response to the refusal of the proposal. Each of the agents is continuously monitoring the input from the user.

FIG. 7G shows the screen in the course of receiving additional text inputted from the user according to an embodiment of the present invention. After the state shown in FIG. 7F, the user inputs additional text. FIG. 7G shows the screen immediately after the additional text is inputted. In the screen, the additional text inputted from the user is displayed. As a result of the refusal of the similar document previously display, the display of the similar document already disappears. The editor unit (110) is continuously waiting for further text input from the user. Based on the additional text input, the similar and domain document proposal agent recognizes that the document in process of creation by the user is a document for a case where the user was late for an appointment. Then, the similar and domain document proposal agent starts searching the database for a document for the case where the user was late for an appointment. The similar and domain document proposal agent passes the retrieved similar document to the editor unit (110). Each of the agents is continuously monitoring the input from the user.

FIG. 7H shows the screen in which the similar document is proposed according to an embodiment of the present invention. After the state shown in FIG. 7G, the editor unit (110) displays the similar document received from the similar and domain document proposal agent, in the agent display section (702). FIG. 7H shows the screen immediately after the similar document is completely displayed. In the screen, the similar document retrieved by the similar and domain document proposal agent is displayed in a balloon form. Here, the similar document includes changeable areas. The changeable areas are displayed as underlined parts, that is, "Yamada Taro", "was caught in incident congestion" and "Suzuki Jiro". In the display example of the proposal, an addressee is already replaced with "Yamada Taro" which is inputted in text by the user. In addition, the part of the reason for being late and the part of the sender are prepared as the changeable areas. "2/2" in the proposal indicates that there are two similar documents proposed by the similar and domain document proposal agent, and that the proposal displayed in the screen is the second one of the two proposals. The editor unit (110) is continuously waiting for text input from the user. The similar and domain document proposal agent is waiting for an instruction indicating the adoption or refusal of the proposed similar document from the user. Each of the agents is continuously monitoring the input from the user.

FIG. 7I shows the screen of an example in which choices are provided to a changeable area according to an embodiment of the present invention. After the state shown in FIG. 7H, the user selects one of the changeable areas, that is, the area of "was caught in incident congestion". FIG. 7I shows the screen in which the area is being selected. In the screen, choices for the changeable area in the proposed similar document are displayed. The changeable area is the part of the reason for being late. Various reasons are prepared as templates for the part of the reason. For the changeable area, one of the choices is selectable by a pointing device. The user can select a choice "was caught in traffic jam", for example. The editor unit (110) is on standby to receive text input from the user. The similar and domain document proposal agent displays the choices for the changeable area. Each of the agents is continuously monitoring the input from the user FIG. 7J shows the screen in which the selection of the candidate for the changeable area is waiting to be confirmed according to an embodiment of the present invention. After the state shown in FIG. 7I, the user selects "was caught in traffic jam". FIG. 7J shows the screen after the selection. The screen shows that "was caught in traffic jam" is selected from the choices for the changeable area. The editor unit (110) is on standby to receive text input from the user. The similar and domain document proposal agent recognizes that "was caught in traffic jam" is selected from the choices for the changeable area. Each of the agents is continuously monitoring the input from the user.

FIG. 7K shows the screen in which the proposal is waiting to be adopted according to an embodiment of the present invention. After the state shown in FIG. 7J, the similar and domain document proposal agent is waiting for an action of the user on the proposed similar document. FIG. 7K shows the screen in which the action is being waited. In the screen, the proposed similar document is displayed. At the changeable area of the proposed similar document, the selected choice "was caught in traffic jam" is displayed. The user determining to adopt the proposed document issues any type of "adoption" instruction such as clicking an icon in order to adopt the proposed document. The editor unit (110) is on standby to receive text input from the user. The similar and domain document proposal agent is waiting for the instruction indicating the adoption or refusal of the proposed similar document. In response to the instruction indicating the adoption from the user, the similar and domain document proposal agent transmits the adopted similar document to the editor unit (110). Each of the agents is continuously monitoring the input from the user.

FIG. 7L shows an example in which the adopted similar document is displayed in the editor screen according to an embodiment of the present invention. After the state shown in FIG. 7K, the user adopts the proposed similar document. FIG. 7L shows the screen immediately after the adoption. The input data display section (701) displays the adopted similar document. The editor unit (110) replaces the text inputted by the user with the adopted similar document. The editor unit (110) is on standby to receive text input from the user. Each of the agents is continuously monitoring the input from the user.

FIG. 7M shows the screen in which a proposal for background data is made according to an embodiment of the present invention. After the state shown in FIG. 7L, the background proposal agent proposes a background color. FIG. 7M shows the screen immediately after the proposal. In the screen, the background color (gray) proposed by the background proposal agent is displayed in a balloon form. The background proposal agent selects the gray because the adopted similar document is a document for apology. The editor unit (110) is on standby to receive text input from the user. The background proposal agent is waiting for the instruction indicating adoption or refusal of the proposed background color from the user. Each of the agents is continuously monitoring the input from the user.

FIG. 7N shows the screen in which the proposed background color is refused according to an embodiment of the present invention. After the state shown in FIG. 7M, the user refuses the proposed background color or does not reply to the proposal for a predetermined time period. The screen shows that the display of the proposed background data is disappearing. The editor unit (110) is on standby to receive text input from the user. Among the agents, the background proposal agent determines that the adoption of the proposed content is refused in response to the instruction indicating refusal from the user, or in response to the fact that the predetermined time period has passed without any reply to the proposal. Each of the agents is continuously monitoring the input from the user.

Figure 8:
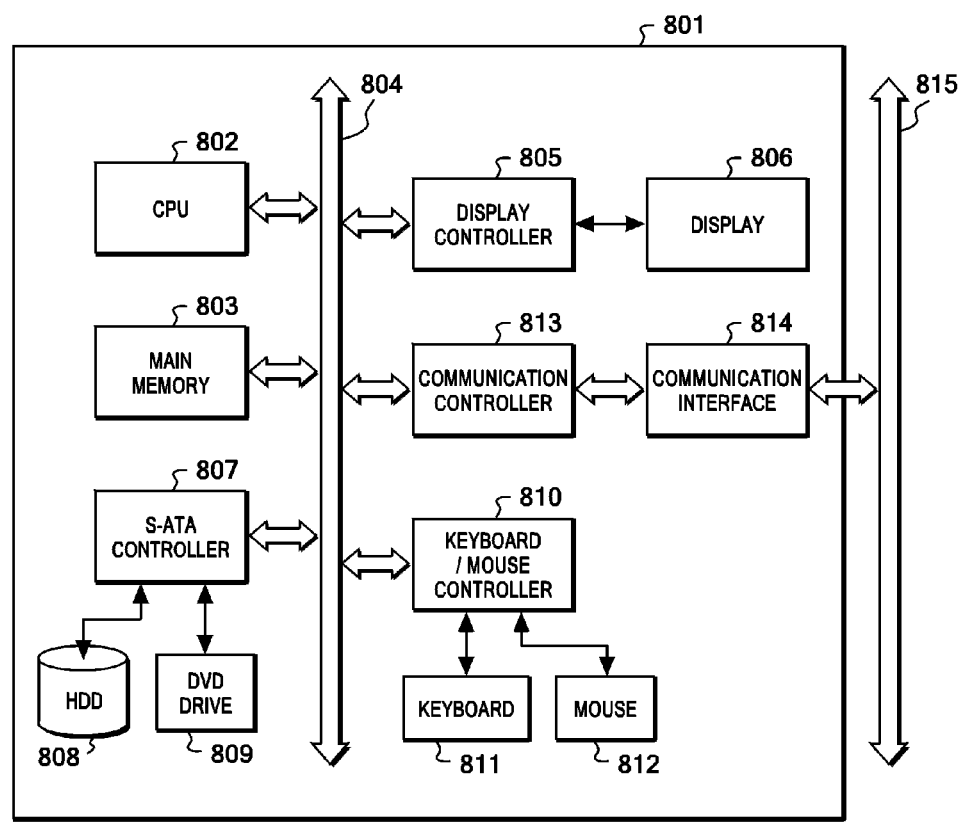
FIG. 8 shows a block diagram of computer hardware of the document creation assistance system shown in FIG. 1A according to the embodiment of the present invention.

FIG. 8 shows a block diagram of computer hardware of the document creation assistance system shown in FIG. 1A according to the embodiment of the present invention. A computer system (801) includes a CPU (802) and a main memory (803) which are connected to a bus (804). The CPU (802) is preferably based on the architecture of 32 bit or 64 bit, and a usable CPU may be, for example, any CPU of the XEON™ series, the CORE™ series, the ATOM™ series, the PENTIUM™ series, and the CELERON™ series produced by Intel Corporation, or any CPU of the PHENOM™ series, the ATHLON™ series, the TURION™ series or the SEMPRON™ series produced by Advanced Micro Devices, Inc. XEON, CORE, ATOM, PENTIUM, AND CELERON are trademarks of Intel Corporation in the United States, other countries, or both. PHENOM, ATLON, TURION, AND SEMPRON are trademarks of Advanced Micro Devices, Inc. in the United States, other countries, or both. A display (806) such as an LCD, for example, is connected to the bus (804) through a display controller (805). The display (806) is used to display information on the computer system (801) connected to the network through a communication line, and information on software running on the computer system on an appropriate graphic interface to manage the computer system (801). A hard disk or silicon disk (808) and a CD-ROM drive, DVD drive or BD drive (809) are also connected to the bus (804) through an IDE or SATA controller (807).

In the hard disk (808), an operating system, a program to provide a JAVA™ platform such as J2EE, other types of programs and data are stored in a manner loadable to the main memory. JAVA is a trademark of Sun Microsystems in the United States, other countries, or both.

The CD-ROM, DVD or BD drive (809) is used to additionally install a program onto the hard disk from a CD-ROM, DVD-ROM or BD according to a need. Moreover, a keyboard (811) and a mouse (812) are connected to the bus (804) through a keyboard/mouse controller (810).

A communication interface (814) complies with Ethernet™ Protocol, for example. Ethernet is a trademark of Xerox Corporation in the United States, other countries, or both. The communication interface (814) is connected to the bus (804) through a communication controller (813), takes a role to physically connect the computer system (801) and a communication line (815), and provides a network interface layer to the TCP/IP communication protocol of a communication function of the operating system of the computer system (801). Here, the communication line may be for a wired LAN environment, or a wireless LAN environment based on wireless LAN connection standards such as IEEE802.11a/b/g/n, for example.

In these embodiments of the present invention, a user does not have to designate a specific content to be proposed in the process of the document creation. More specifically, according to the embodiments of the present invention, without receiving from a user a specific instruction for a content to be proposed, an agent autonomously proposes a content according to the description of a document in process of creation by the user or according to an amount of characters inputted by the user. Therefore, the user can create the document efficiently.

Although the preferred embodiments of the present invention have been described in detail, it should be understood that various changes, substitutions and alternations can be made therein without departing from spirit and scope of the inventions as defined by the appended claims.

What is claimed is:

1. A method for assisting document creation in a computer system:
    monitoring input by a user who is providing the input to a first display area on a display unit to create a document, wherein the input provides content for the document;
    acquiring information comprising at least a part of the document based on the input;
    retrieving proposed content from a plurality of contents accumulated in a storage unit based on a search for the proposed content having a writing style matching the acquired information and indicating a sentence expression form for one of a plain style and a polite style, a search for the proposed content having a document domain matching the acquired information, and a search for the proposed content having background data matching the acquired information to be displayed as a background in the first display area;
    displaying the proposed content in a second display area on the display unit; and
        in response to receiving an adoption of at least a portion of the proposed content from the user, updating the first display area to assist in creating the document.

2. The method according to claim 1, further comprising:
    continuously performing the monitoring;
    searching the plurality of contents on a basis of information on additional input by the user obtained by the continuously performed monitoring;
    retrieving additional proposed content associated with the information on the additional input; and
    displaying the additional proposed content on the display unit.

3. The method according to claim 1, further comprising retrieving at least one of:
    document data including a keyword matching the acquired information or document data associated with the keyword,
    the writing style matching the acquired information,
    the document domain matching the acquired information,
    the background data matching the acquired information, and
    image data matching the acquired information.

4. The method according to claim 1, wherein the acquired information comprises user information, and further comprising retrieving at least one of:
    a document created in the past by the user,
    the writing style created in the past by the user,
    the domain of a document created in the past by the user,
    the background data created in the past by the user, and
    image data created in the past by the user.

5. The method according to claim 1, further comprising:
    in response to determining that proposed content is a document having a changeable area, making one or more candidate terms selectable for the changeable area, wherein each of the one or more candidate terms is a character string.

6. The method according to claim 1, further comprising:
    creating a new content from the acquired information; and
    accumulating the newly created content as content created at a past time in the storage unit.

7. The method according to claim 1, further comprising:
    presenting any one of a background pattern, a background color, a background image, and a background illustration associated with a character string obtained from the acquired information.

8. The method according to claim 1, wherein the process of the document creation includes document editing, and wherein the acquired information is a whole or a part of a document being edited.

9. The method according to claim 1, wherein the process of the document creation includes new document creation, and wherein the acquired information is user information.

10. A non-transitory storage unit storing a computer program, that, when executed by a computer, causes:
- monitoring input by a user who is providing the input to a first display area on a display unit to create a document, wherein the input provides content for the document;
- acquiring information comprising at least a part of the document based on the input;
- retrieving proposed content from a plurality of contents accumulated in the storage unit based on a search for the proposed content having a writing style matching the acquired information and indicating a sentence expression form for one of a plain style and a polite style, a search for the proposed content having a document domain matching the acquired information, and a search for the proposed content having background data matching the acquired information to be displayed as a background in the first display area;
- displaying the proposed content in a second display area on the display unit; and
- in response to receiving an adoption of at least a portion of the proposed content from the user, updating the first display area to assist in creating the document.

11. The storage unit according to claim 10, wherein the computer program, when executed by the computer, causes:
- continuously performing the monitoring;
- searching the plurality of contents on a basis of information on additional input by the user obtained by the continuously performed monitoring;
- retrieving additional proposed content associated with the information on the additional input; and
- displaying the additional proposed content on the display unit.

12. The storage unit according to claim 10, wherein the computer program, when executed by the computer, causes retrieval of at least one of:
- document data including a keyword matching the acquired information or document data associated with the keyword,
- the writing style matching the acquired information,
- the document domain matching the acquired information,
- the background data matching the acquired information, and
- image data matching the acquired information.

13. The storage unit according to claim 10, wherein the acquired information comprises user information, and wherein the computer program, when executed by the computer, causes retrieval of at least one of:
- a document created in the past by the user,
- the writing style created in the past by the user,
- the domain of a document created in the past by the user,
- the background data created in the past by the user, and
- image data created in the past by the user.

14. The storage unit according to claim 10, wherein the computer program, when executed by the computer, causes:
- presenting any one of a background pattern, a background color, a background image, and a background illustration associated with a character string obtained from the acquired information.

15. A computer system, comprising:
- a CPU; and
- memory coupled to the CPU, wherein the memory stores a program that, when executed by a computer, causes operations of:
- monitoring input by a user who is providing the input to a first display area on a display unit to create a document, wherein the input provides content for the document;
- acquiring information comprising at least a part of the document based on the input;
- retrieving proposed content from a plurality of contents accumulated in a storage unit based on a search for the proposed content having a writing style matching the acquired information and indicating a sentence expression form for one of a plain style and a polite style, a search for the proposed content having a document domain matching the acquired information, and a search for the proposed content having background data matching the acquired information to be displayed as a background in the first display area;
- displaying the proposed content in a second display area on the display unit; and
- in response to receiving an adoption of at least a portion of the proposed content from the user, updating the first display area to assist in creating the document.

16. The computer system according to claim 15, wherein the operations further comprise:
- continuously performing the monitoring;
- searching the plurality of contents on a basis of information on additional input by the user obtained by the continuously performed monitoring;
- retrieving additional proposed content associated with the information on the additional input; and
- displaying the additional proposed content on the display unit.

17. The computer system according to claim 15, wherein the operations further comprise retrieving at least one of:
- document data including a keyword matching the acquired information or document data associated with the keyword,
- the writing style matching the acquired information,
- the document domain matching the acquired information,
- the background data matching the acquired information, and
- image data matching the acquired information.

18. The computer system according to claim 15, wherein the operations further comprise retrieving at least one of:
- a document created in the past by the user,
- the writing style created in the past by the user,
- the domain of a document created in the past by the user,
- the background data created in the past by the user, and
- image data created in the past by the user.

19. The computer system according to claim 15, wherein the operations further comprise:
- presenting any one of a background pattern, a background color, a background image, and a background illustration associated with a character string obtained from the acquired information.

* * * * *